United States Patent
Marutani et al.

(10) Patent No.: US 10,464,545 B2
(45) Date of Patent: Nov. 5, 2019

(54) CONTROL SYSTEM OF A FOUR-WHEEL DRIVE VEHICLE AND GRADIENT VALUE SETTING DEVICE OF A VEHICLE

(71) Applicant: Mazda Motor Corporation, Aki-gun, Hiroshima (JP)

(72) Inventors: Tetsushi Marutani, Higashihiroshima (JP); Hideki Tani, Hiroshima (JP); Daisuke Kofu, Hiroshima (JP); Yasushi Yagi, Hiroshima (JP)

(73) Assignee: Mazda Motor Corporation, Aki-gun, Hiroshima (JP)

( * ) Notice: Subject to any disclaimer, the term of this patent is extended or adjusted under 35 U.S.C. 154(b) by 146 days.

(21) Appl. No.: 15/615,990

(22) Filed: Jun. 7, 2017

(65) Prior Publication Data
US 2017/0361847 A1 Dec. 21, 2017

(30) Foreign Application Priority Data
Jun. 21, 2016 (JP) .................................. 2016-122662

(51) Int. Cl.
*B60W 10/119* (2012.01)
*B60W 30/18* (2012.01)
(Continued)

(52) U.S. Cl.
CPC ......... *B60W 10/119* (2013.01); *B60K 17/348* (2013.01); *B60K 23/0808* (2013.01);
(Continued)

(58) Field of Classification Search
CPC ......... B60W 10/119; B60W 2550/142; B60W 2720/403; B60W 30/18072;
(Continued)

(56) References Cited

U.S. PATENT DOCUMENTS 4,630,704 A * 12/1986 Yamakawa ............ B60K 23/08
                                            180/233
5,446,658 A *  8/1995 Pastor ................... B60G 17/019
                                            701/1
(Continued)

FOREIGN PATENT DOCUMENTS

DE    102006045303    *  2/2008   ......... B60R 21/0132
DE    102006061249    *  6/2008   ............ B60T 8/172
(Continued)

OTHER PUBLICATIONS

EPO machine translation of JP 2000-062494 (original JP document published Feb. 29, 2000) (Year: 2000).*

*Primary Examiner* — Behrang Badii
*Assistant Examiner* — David A Testardi
(74) *Attorney, Agent, or Firm* — Alleman Hall Creasman & Tuttle LLP

(57) ABSTRACT

A control system of a four-wheel drive vehicle and a gradient value setting device of the vehicle is provided so as to reliably control a wheel skid despite the vehicle facing an intersecting direction intersecting a maximum tilt line direction. The vehicle includes an engine, front and rear wheels, an electronic control 4WD coupling, and a control unit. The distribution amount of the driving force to the rear wheels is set by the electronic control 4WD coupling. The control unit determines whether or not the vehicle faces the intersecting direction on the inclined road, and if so, sets the driving force distribution amount so that the difference between the driving force distribution amount to the front wheels and to the rear wheels is smaller as compared with on a flat road, and commands the electronic control 4WD coupling to distribute the driving force by the distribution amount.

13 Claims, 13 Drawing Sheets

(51) Int. Cl.
    *B60K 17/348*    (2006.01)
    *B60K 23/08*    (2006.01)
    *B60W 10/04*    (2006.01)
(52) U.S. Cl.
    CPC ...... *B60W 10/04* (2013.01); *B60W 30/18027*
        (2013.01); *B60W 30/18118* (2013.01); ***B60W
        30/18009* (2013.01); *B60W 2520/125***
        (2013.01); *B60W 2530/00* (2013.01); ***B60W
        2550/142* (2013.01); *B60W 2720/403***
        (2013.01)
(58) Field of Classification Search
    CPC ..... B60W 30/18027; G01C 9/00; G01C 9/08;
        B60K 17/34; B60K 17/348; B60K 17/35;
        B60K 17/36; B60K 23/08; B60K
        23/0808; B60K 2023/0816; B60K
        2023/0856; B60K 2023/0858; B60G
        17/01908
    See application file for complete search history.

(56) References Cited

U.S. PATENT DOCUMENTS

| | | | | |
|---|---|---|---|---|
| 6,178,375 B1 * | 1/2001 | Breunig | ................ | B60R 21/013 280/5.507 |
| 6,351,694 B1 * | 2/2002 | Tseng | ................ | B60T 8/172 180/197 |
| 7,463,953 B1 * | 12/2008 | Lee | ................ | B60W 40/12 701/1 |
| 9,168,950 B1 * | 10/2015 | Chanda | ................ | B60G 21/007 |
| 9,505,306 B1 * | 11/2016 | Zimmerman | ................ | B60K 35/00 |
| 9,758,167 B1 * | 9/2017 | Pandit | ................ | B60W 30/18009 |
| 2003/0130778 A1 * | 7/2003 | Hrovat | ................ | B60R 16/0233 701/45 |
| 2003/0182025 A1 * | 9/2003 | Tseng | ................ | B60G 17/0162 701/1 |
| 2003/0236606 A1 * | 12/2003 | Lu | ................ | B60G 17/0162 701/70 |
| 2005/0078000 A1 * | 4/2005 | Ouchi | ................ | G01C 9/08 340/440 |
| 2005/0085950 A1 * | 4/2005 | Altenkirch | ................ | B60G 17/01908 701/1 |
| 2006/0069467 A1 * | 3/2006 | Fischer | ................ | B60G 17/0165 701/1 |
| 2009/0326858 A1 * | 12/2009 | Ueda | ................ | B60W 40/12 702/141 |
| 2010/0100272 A1 * | 4/2010 | Chen | ................ | B60T 8/172 701/31.4 |
| 2010/0250056 A1 * | 9/2010 | Perkins | ................ | B60T 8/172 701/33.4 |
| 2011/0257827 A1 * | 10/2011 | Ryu | ................ | B60T 8/17551 701/31.4 |
| 2016/0068165 A1 * | 3/2016 | Chen | ................ | B60W 40/11 701/32.9 |
| 2016/0068166 A1 * | 3/2016 | Chen | ................ | B60W 40/112 701/32.9 |

FOREIGN PATENT DOCUMENTS

| | | | | |
|---|---|---|---|---|
| FR | 2884311 A1 * | 10/2006 | ......... | B60W 40/072 |
| FR | 2912363 A1 * | 8/2008 | ............ | B60T 8/172 |
| GB | 2388349 A * | 11/2003 | ......... | B60K 17/344 |
| JP | 11230742 A | 8/1999 | | |
| JP | 2000062494 A * | 2/2000 | | |
| JP | 2000177556 A * | 6/2000 | ............ | B60T 8/1755 |
| JP | 2000177556 A | 6/2000 | | |
| JP | 2001225657 A | 8/2001 | | |
| JP | 2001356014 A * | 12/2001 | | |
| JP | 2001356014 A | 12/2001 | | |
| JP | 2006138800 A * | 6/2006 | | |
| JP | 2006349593 A * | 12/2006 | ............ | B60T 8/172 |
| JP | 2007210412 A * | 8/2007 | ......... | B60R 21/0132 |
| JP | 2008185418 A * | 8/2008 | | |
| JP | 2008185418 A | 8/2008 | | |
| JP | 2013075651 A | 4/2013 | | |

* cited by examiner

FIG. 7A  V=V₁
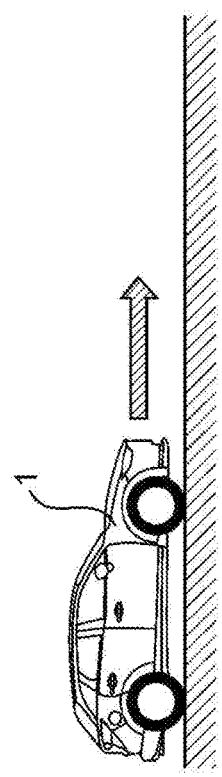
FIG. 7B  V=V₂
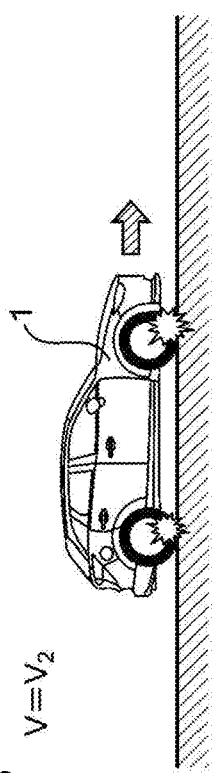
FIG. 7C  V=0
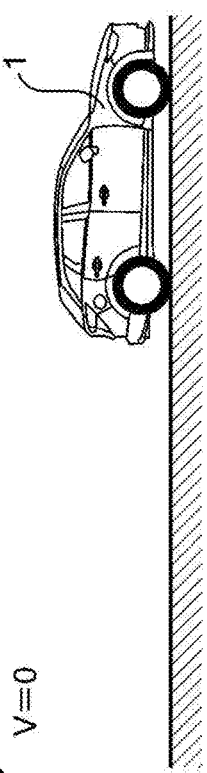
FIG. 7D
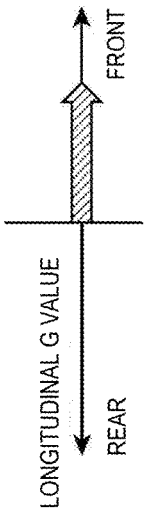
FRONT / LONGITUDINAL G VALUE / REAR
FIG. 7E
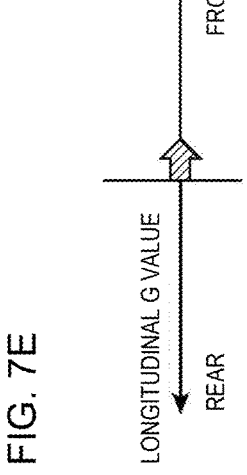
FRONT / LONGITUDINAL G VALUE / REAR

CONTROL SYSTEM OF A FOUR-WHEEL DRIVE VEHICLE AND GRADIENT VALUE SETTING DEVICE OF A VEHICLE

FIELD OF THE INVENTION

The present invention relates to a control system of a four-wheel drive vehicle and a gradient value setting device of a vehicle, specifically a device that employs a setting technique of a gradient value when a direction of the vehicle intersects a maximum tilt line direction.

BACKGROUND ART

Traditionally, a four-wheel drive vehicle has been in practical use based on a FF vehicle (a front engine/front drive vehicle) or a FR vehicle (a front engine/rear drive vehicle). For example, a four-wheel drive vehicle based on the FF vehicle is controlled to distribute most of the driving force to front wheels under normal traveling conditions and increase the distribution of the driving force to the rear wheels at the traveling time on a low μ road (a low friction test road). Therefore, four-wheel drive vehicles based on FF or FR vehicles are normally driven under close to two-wheel drive conditions, and are driven by setting the distribution of the driving force between the front wheels and the rear wheels based on road surface conditions or vehicle attitudes, and also input information from a driver. Such a four-wheel drive vehicle can minimize energy loss because it travels by two-wheel drive normally, and also can control wheel skid caused by traveling on such low μ roads using four-wheel drive.

In Patent Document 1, a four-wheel drive vehicle has a longitudinal G (acceleration) sensor and calculates a road surface gradient value based on signals from the longitudinal G sensor. The four-wheel drive vehicle disclosed in Patent Document 1 uses the road surface gradient value that is calculated based on signals from the longitudinal G sensor, and sets a distribution of the driving force between the front wheels and the rear wheels. Accordingly, the four-wheel drive vehicle in Patent Document 1, for example, can control the occurrence of skids when starting from an uphill stance on a low μ road.

RELATED ART

Patent Document

[Patent Document 1] Japanese Unexamined Patent Application Publication No. 2001-225657

SUMMARY OF THE INVENTION

Problems to be Solved by the Invention

However, a conventional technique including the technique proposed in Patent Document 1 cannot calculate an accurate road surface gradient value when the vehicle faces a direction intersecting the maximum tilt line (Fall Line) direction, and a skid might occur. Specifically, in the technique proposed in Patent Document 1, since the road surface gradient value is calculated based on only signals from the longitudinal G sensor, when the vehicle faces the direction intersecting the maximum tilt line direction, only the longitudinal direction component among the G (acceleration) value related to the vehicle is detected. Due to this, the technique in Patent Document 1 cannot accurately set the distribution of the driving force between the front wheels and the rear wheels when the vehicle faces the direction intersecting the maximum tilt line direction.

Moreover, in the technique proposed in Patent Document 1, when the vehicle faces an orthogonal direction (horizontal direction) of the maximum tilt line direction, the longitudinal G sensor cannot detect the G value, so that the driving force might be distributed to only the front wheels in case of the FF vehicle base, and the driving force might be distributed to only the rear wheels in case of the FR vehicle base. In this case, wheel skid might occur according to the inclination of the vehicle.

The aim of the present invention is to solve the above issues by providing a control system of a four-wheel drive vehicle and a gradient value setting device of a vehicle to reliably control wheel skid even when the vehicle faces a direction intersecting the maximum tilt line direction.

BRIEF SUMMARY OF THE INVENTION

A control system of a four-wheel drive vehicle as one aspect of the present invention is applicable to four-wheel drive vehicles having the following configurations.

The four-wheel drive vehicle has a driving source, front wheels and rear wheels, and a driving force distribution device.

The driving source generates a driving force for vehicle traveling.

The driving force distribution device distributes a driving force to the front wheels and the rear wheels.

The control system comprises a processor configured to execute instructions to (i) determine whether or not the four-wheel drive vehicle faces an intersecting direction intersecting a maximum tilt line direction on an inclined road, (ii) when determining the four-wheel drive vehicle faces the intersecting direction, set a driving force distribution amount so that a difference between a driving force amount distributed to the front wheels and the driving force amount distributed to the rear wheels is smaller than in a case where the four-wheel drive vehicle is on a flat road, and command the driving force distribution device so as to distribute the driving force by the set driving force distribution amount.

A control system of a four-wheel drive vehicle according to the present aspect sets the driving force distribution amount so that the difference between the driving force amount distributed to the front wheels and the driving force amount distributed to the rear wheels is small when the four-wheel drive vehicle faces the intersecting direction (the direction intersecting the maximum tilt line direction on the inclined road). Accordingly, the four-wheel drive vehicle can control a wheel skid even when it faces the intersecting direction on the inclined road.

Therefore, the control system of the four-wheel drive vehicle according to the present aspect can reliably control wheel skid, and stable starting and traveling can be possible.

Moreover, in the above, "so that a difference between a driving force amount distributed to the front wheels and a driving force amount distributed to the rear wheels is smaller" means, for example, increasing the driving force amount distributed to the rear wheels in case of the FF-based four-wheel drive vehicle as compared with on the flat road, and increasing the driving force amount distributed to the front wheels in case of the FR-based four-wheel drive vehicle as compared with on the flat road.

According to another aspect of the present invention, in the above configuration, the four-wheel drive vehicle has a lateral G sensor for detecting an acceleration in a horizontal direction (vehicle width direction) of the four-wheel drive vehicle, and when a lateral G value output from the lateral G sensor is equal to or greater than a predetermined value, the processor determines that the four-wheel drive vehicle faces the intersecting direction.

The control system of the four-wheel drive vehicle according to the present aspect determines the direction of the four-wheel drive vehicle based on the lateral G value output from the lateral G sensor. Accordingly, with a simple configuration, when the four-wheel drive vehicle is on an inclined road, wheel skid can be reliably controlled.

Therefore, the control system of the four-wheel drive vehicle according to the present aspect can perform stable starting and traveling on the inclined road while suppressing an increase in manufacturing cost.

Moreover, the lateral G sensor mounted on the four-wheel drive vehicle might be singular or plural in number. When a plurality of lateral G sensor are mounted, the control system may use a mean value of the output signals or make a decision according to a majority of the output signals.

In the above configuration, the four-wheel drive vehicle has a longitudinal G sensor for detecting an acceleration in a longitudinal direction of the four-wheel drive vehicle, and (iv) when the four-wheel drive vehicle is traveling or stopping on the inclined road, the lateral G value output from the lateral G sensor is equal to or greater than a predetermined value, and a longitudinal G value output from the longitudinal G sensor is equal to or greater than a predetermined value, the processor sets a composite G value of the lateral G value and the longitudinal G value, and (v) sets the driving force distribution amount based on the set composite G value.

The control system of the four-wheel drive vehicle according to the present aspect, at the time of setting the driving force distribution amount like the above, uses the composite G value of the lateral G value from the lateral G sensor and the longitudinal G value from the longitudinal G sensor. Accordingly, even though the four-wheel drive vehicle faces the direction (uphill direction, downhill direction) along the maximum tilt line direction or the intersecting direction, wheel skid can be reliably controlled.

Therefore, the control system of the four-wheel drive vehicle according to the present aspect, even though the four-wheel drive vehicle faces any direction on the inclined road, can perform stable starting and traveling of the four-wheel drive vehicle.

In the above configuration, (vi) when the four-wheel drive vehicle is traveling or stopping on the inclined road, the lateral G value output from the lateral G sensor is equal to or greater than a predetermined value, and the longitudinal G value output from the longitudinal G sensor is equal to or greater than a predetermined value, the processor sets a composite G value of the lateral G value and the longitudinal G value, and (vii) sets a direction of the four-wheel drive vehicle against the maximum tilt line direction as well as sets a road surface gradient value of the inclined road based on the set composite G value, and (viii) sets the driving force distribution amount based on the set road surface gradient value and the set direction of the four-wheel drive vehicle.

The control system of the four-wheel drive vehicle according to the present aspect sets a direction of the four-wheel drive vehicle against the maximum tilt line direction as well as sets a road surface gradient value of the inclined road based on the above set composite G value, and then sets the driving force distribution amount like the above. Therefore, the control system of the four-wheel drive vehicle according to the present aspect, even though the four-wheel drive vehicle faces any directions on the inclined road, can reliably control wheel skid and perform stable starting and traveling of the four-wheel drive vehicle.

In the control system of the four-wheel drive vehicle according to another aspect of the present invention, in the above configuration, the processor (ix) determines whether or not the four-wheel drive vehicle is traveling and (x) when determining the four-wheel drive vehicle is traveling, executes a first correction to subtract a G value generated according to traveling of the four-wheel drive vehicle from the longitudinal G value.

While vehicles such as the four-wheel drive vehicle are traveling, the longitudinal G is applied along with traveling. Since the control system of the four-wheel drive vehicle according to the present aspect executes the first correction even when the longitudinal G is applied to the four-wheel drive vehicle along with traveling, only the longitudinal G value due to the gradient of the inclined road can be extracted. Therefore, wheel skid due to the road surface gradient is effectively controlled.

In the control system of the four-wheel drive vehicle according to another aspect of the present invention, in the above configuration, the processor (xi) determines whether or not the four-wheel drive vehicle is traveling and (xii) when determining the four-wheel drive vehicle is traveling, executes a second correction to subtract the G value generated according to traveling of the four-wheel drive vehicle from the lateral G value.

While vehicles such as the four-wheel drive vehicle are traveling, the lateral G is applied along with traveling. Since the control system of the four-wheel drive vehicle according to the present aspect executes the second correction even when the lateral G is applied to the four-wheel drive vehicle along with traveling, only the lateral G value due to the gradient of the inclined road can be extracted. Therefore, wheel skid due to the road surface gradient is effectively controlled.

In the above configuration, the four-wheel drive vehicle has a traveling direction estimation device for estimating a traveling direction of the four-wheel drive vehicle, and the processor determines whether the four-wheel drive vehicle proceeds along the inclined road in an ascent slope direction or a descent slope direction based on an estimated value related to the traveling direction from the traveling direction estimation device, and when determining that the four-wheel drive vehicle proceeds along the inclined road in the ascent slope direction or the descent slope direction, sets the driving force distribution amount so that the difference between the driving force distribution amount to the front wheels and the driving force distribution amount to the rear wheels is smaller than in a case of determining that the four-wheel drive vehicle proceeds along the inclined road in neither the ascent slope direction nor the descent slope direction.

The control system of the four-wheel drive vehicle according to this aspect can previously set the driving force distribution amount to one of the drive wheels based on the estimated value related to the traveling direction. Accordingly, for example, when the four-wheel drive vehicle that stopped in the intersecting direction intersecting the maximum tilt line direction turns immediately after the start and ascends or descends a slope, wheel skid can be reliably controlled since the driving force distribution amount like the above is set in advance.

In the control system of the four-wheel drive vehicle according to another aspect of the present invention, in the above configuration, the traveling direction estimation device may be a steering angle sensor for detecting a steering angle.

In the present aspect, a steering angle sensor is adopted as a specific example of the traveling direction estimation device. Therefore, especially without additional sensor equipment, the estimation related to the traveling direction can be executed.

Moreover, in addition to the steering angle sensor, a direction indicator can be used as the traveling direction estimation device. When a driver operates the direction indicator to either the right or left, the direction directed by the direction indicator can be estimated as the traveling direction. Accordingly, the driving force distribution amount like the above might be set in advance.

A gradient value setting device for a vehicle, according to one aspect of the present invention, targets the following configurations.

The vehicle has a lateral G sensor and a longitudinal G sensor.

The lateral G sensor detects an acceleration in a horizontal direction of the vehicle.

The longitudinal G sensor detects an acceleration in a longitudinal direction of the vehicle.

The gradient value setting device comprises a processor. When the vehicle is traveling or stopping on the inclined road, a lateral G value output from the lateral G sensor is equal to or greater than a predetermined value, and a longitudinal G value output from the longitudinal G sensor is equal to or greater than a predetermined value, the processor is configured to execute instructions to (xv) set a composite G value of the lateral G value and the longitudinal G value and (xvi) set a road surface gradient value of the inclined road based on the set composite G value.

The gradient value setting device of the vehicle according to the present aspect sets the road surface gradient value of the inclined road after receiving the input of not only the longitudinal G value from the longitudinal G sensor but also the lateral G value from the lateral G sensor and setting the composite G value therefrom. Therefore, setting the road surface gradient value with higher accuracy is possible as compared to the technique of Patent Document 1, which sets the road surface gradient value based on only the longitudinal G value. Accordingly, not only for the four-wheel drive vehicle, a wide range of applications such as controlling wheel skid of the vehicle is possible.

EFFECTS OF THE INVENTION

In each above aspect of the invention, even though the four-wheel drive vehicle faces the intersecting direction against the maximum tilt line direction, wheel skid can be controlled.

BRIEF DESCRIPTION OF THE DRAWINGS

FIGS. 7A to 7C are schematic diagrams showing the state in order when the four-wheel drive vehicle applies a brake, FIG. 7D shows G that applies to the four-wheel drive vehicle during the braking, and FIG. 7E shows G that applies to the four-wheel drive vehicle immediately after the stopping.

DETAILED DESCRIPTION OF THE EMBODIMENTS

Hereinafter, the embodiments of the present invention will be described with reference to the drawings. Moreover, the described embodiments below are one of embodiments of the present invention, and the present invention is not limited to the embodiments below except the essential configuration.

First Embodiment

1. Schematic Diagram of the Four-Wheel Drive Vehicle 1

The schematic diagram of a first embodiment of the present invention according to the four-wheel drive vehicle 1 will be described by using FIG. 1. Moreover, FIG. 1 is a typical schematic diagram of the four-wheel drive vehicle 1 and the arrangement or size of each component thereof is not limited to the layouts and the sizes in FIG. 1.

Figure 1:
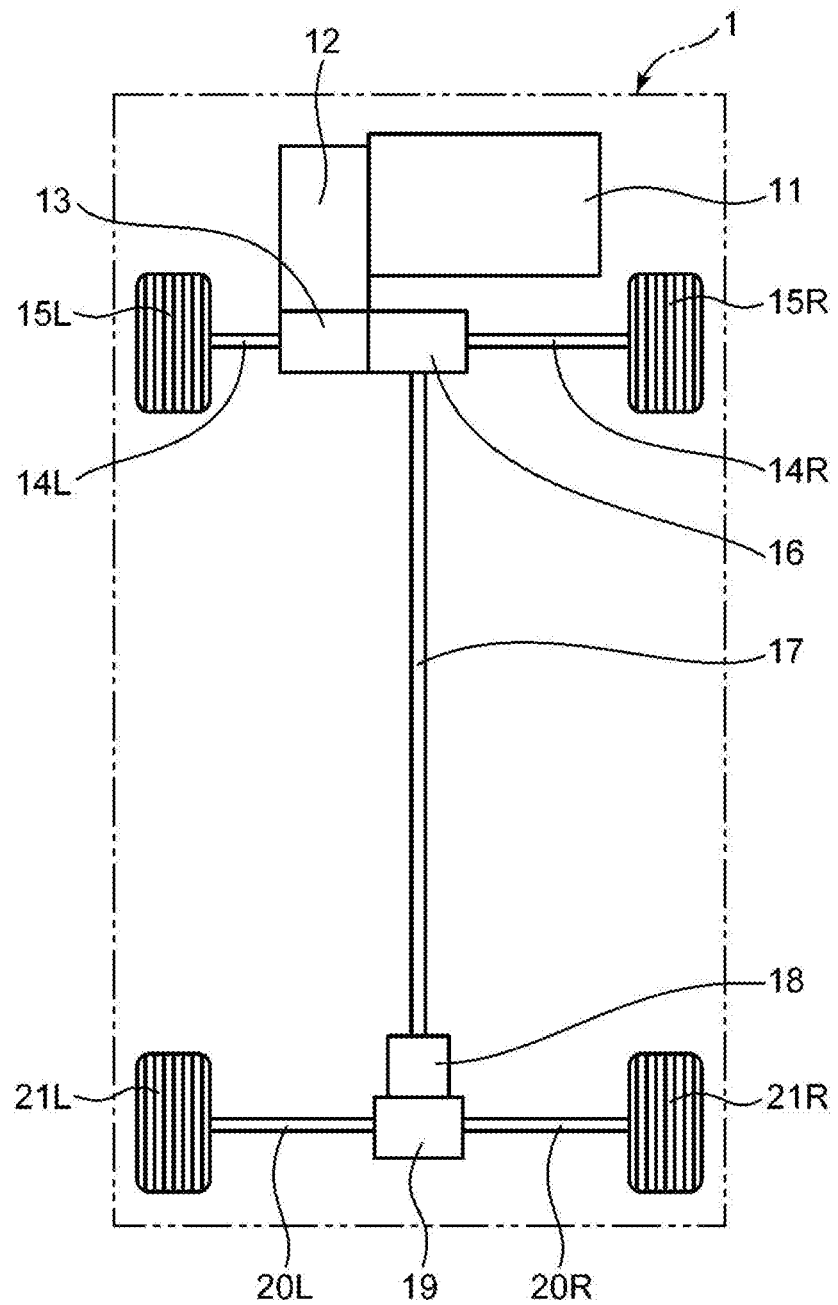
FIG. 1 is a schematic diagram showing a schematic configuration of a four-wheel drive vehicle according to a first embodiment of the present invention.

As shown in FIG. 1, an engine 11 of the four-wheel drive vehicle 1 is arranged. The engine 11 is for example, a gasoline engine or a diesel engine. An automatic transmission 12 and a front differential gear 13 are connected to an output side of a driving force of the engine 11 in order.

The driving force generated by the engine 11 is transmitted to a left front drive shaft 14L and a right front drive shaft 14R through the automatic transmission 12 and the front differential gear 13, and then transmitted to left front wheels 15L and right front wheels 15R.

Moreover, the four-wheel drive vehicle 1 according to the present embodiment is the four-wheel drive vehicle based on the FF vehicle (front engine/front drive vehicle) and the front wheels 15L and 15R are the main drive wheels.

Therefore, most of the driving forces are distributed to the front wheels 15L and 15R under normal traveling conditions, such as on a flat road.

Moreover, the four-wheel drive vehicle 1 has a power divide mechanism (PTO: Power Take-Off) 16 that siphons a part of the driving force generated by the engine 11 to a propeller shaft 17. On a rear end part of the propeller shaft 17, a left rear drive shaft 20L and a right rear drive shaft 20R are connected through an electronic control 4WD coupling 18, which is a driving force distribution device, and a rear differential gear 19. A left rear wheel 21L is mounted on a shaft end of the left rear drive shaft 20L, and a right rear wheel 21R is mounted on a shaft end of the right rear drive shaft 20R.

As mentioned above, the four-wheel drive vehicle 1 according to the present embodiment is the four-wheel drive vehicle based on the FF vehicle (front engine/front drive vehicle) and the rear wheels 21L and 21R are the sub drive wheels.

A portion of the driving force divided by the power divide mechanism 16 is transmitted to the left rear drive shaft 20L and the right rear drive shaft 20R through the propeller shaft 17, the electronic control 4WD coupling 18, and the rear differential gear 19, and can be transmitted to the left rear wheel 21L and the right rear wheel 21R.

In the four-wheel drive vehicle 1 according to the present embodiment, the driving force distribution amount can be freely changed by the electronic control 4WD coupling 18, and in accordance with the road surface conditions, a torque distribution can be freely changed from front wheels:rear wheels=100:0 to the front and rear wheels direct coupling state (generally, front wheels:rear wheels=50:50).

2. The Control System Configuration of the Four-Wheel Drive Vehicle 1

The control system configuration of the four-wheel drive vehicle 1 according to the present embodiment will be described by using FIG. 2.

Figure 2:
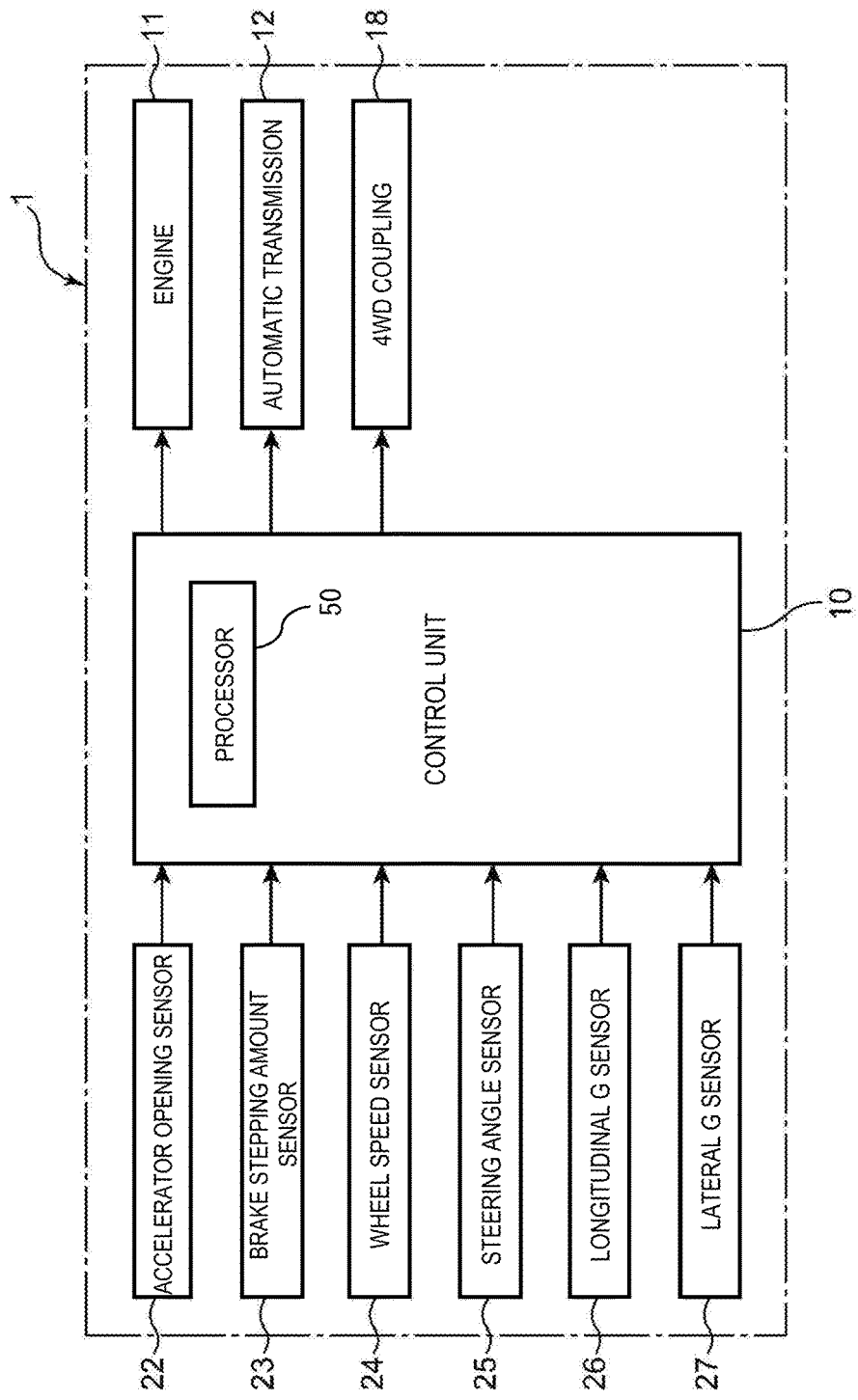
FIG. 2 is a schematic block diagram showing a configuration according to controls of the four-wheel drive vehicle.

As shown in FIG. 2, the four-wheel drive vehicle 1 has a control unit 10 comprising a processor 50 configured to receive various signals and to execute instructions for controlling the engine 11, the automatic transmission 12, and the electronic control 4WD coupling 18. The control system may be embodied by the control unit 10.

Moreover, the four-wheel drive vehicle 1 has an accelerator opening sensor 22, a brake stepping amount sensor 23, a wheel speed sensor 24, a steering angle sensor 25, a longitudinal G sensor 26, and a lateral G sensor 27. The detection signals related to an accelerator opening degree are input from the accelerator opening sensor 22 to the control unit 10, similarly, the detection signals related to a brake stepping amount from the brake stepping amount sensor 23, the detection signals related to a wheel speed from the wheel speed sensor 24, and the detection signals related to a steering angle from the steering angle sensor 25 are input to the control unit 10 respectively.

Furthermore, the longitudinal G value of the four-wheel drive vehicle 1 is input from the longitudinal G sensor 26 to the control unit 10, and the lateral G value of the four-wheel drive vehicle 1 is input from the lateral G sensor 27 to the control unit 10.

3. Control that the Control Unit 10 Executes

The control of four-wheel drive vehicle 1 that the control unit 10 executes will be described by using FIG. 3.

First of all, the control unit 10 reads the above mentioned various sensor signals (Step S1).

Next, the control unit 10 determines whether or not the vehicle speed of the four-wheel drive vehicle 1 is less than a predetermined value from the read various sensor signals, in other words, determines whether or not the four-wheel drive vehicle 1 is substantially in the stopping state (Step S2). When the control unit 10 determines the vehicle speed is less than the predetermined value (Step S2: Yes), and subsequently, determines whether a prescribed period passed from the time when the vehicle speed became less than the predetermined value (Step S3). That is to exclude the components that become noise for the following controls, since the G (acceleration) due to the braking applies to the vehicle immediately after stopping when stepping on the brake.

Moreover, the prescribed period at Step S3 is, for example, the period approximately between 0.1 sec. to 0.9 sec.

On one hand, at Step S2, when the vehicle speed is not determined to be less than the predetermined value, in other words, when the four-wheel drive vehicle 1 is determined to be substantially traveling (Step S2: No), the first correction for correcting the longitudinal G value from the longitudinal G sensor 26 is executed (Step S4), and the second correction for correcting the lateral G value from the lateral G sensor 27 is executed (Step S5). With these corrections, when the four-wheel drive vehicle 1 is traveling, the longitudinal G is applied by acceleration and deceleration, and the lateral G is also applied by turning as well. Therefore, it the components that become noise are excluded.

Next, the control unit 10 determines whether the read lateral G value is equal to or greater than the predetermined value (Step S6). When the control unit 10 determines the lateral G value is equal to or greater than the predetermined value (Step S6: Yes), the control unit 10 subsequently determines whether or not the read longitudinal G value is equal to or greater than the predetermined value (Step S7).

On one hand, at Step S6, when the lateral G value is determined to be less than the predetermined value (Step S6: No), a road surface gradient value is set from the longitudinal G value and also a direction of the four-wheel drive vehicle 1 against the maximum tilt line direction is set (Step S8). That is, when the lateral G value is less than the predetermined value, the four-wheel drive vehicle 1 is considered to face to a direction (uphill or downhill direction) along the maximum tilt line direction on the inclined road. Therefore, in this case, without considering the lateral G value, the direction of the four-wheel drive vehicle 1 against the maximum tilt line direction can be set while the road surface gradient value is set by only the longitudinal G value.

At Step S7, when the longitudinal G value is determined to be equal to or greater than the predetermined value (Step S7: Yes), the composite G value of the lateral G value and the longitudinal G value is set (Step S9), the road surface gradient value is set from the composite G value, and also the direction of the four-wheel drive vehicle 1 against the maximum tilt line direction is set (Step S10). Accordingly, when the four-wheel drive vehicle 1 faces the intersecting direction against the maximum tilt line direction, the direction of the four-wheel drive vehicle 1 against the maximum tilt line direction can be set while the accurate road surface gradient value is set.

On one hand, at Step S7, when the longitudinal G value is determined to be less than the predetermined value (Step S7: No), the direction of the four-wheel drive vehicle 1 against the maximum tilt line direction is set (Step S11) while the road surface gradient value is set from the lateral G value. Specifically, at Step S7, when the longitudinal G value is less than the predetermined value, the four-wheel drive vehicle 1 faces nearly an orthogonal direction of the maximum tilt line direction. In this case, since the longitudinal G value is hardly detected, the direction of the four-wheel drive vehicle 1 against the maximum tilt line direction can be set while the road surface gradient value is set by only the lateral G value.

Next, after setting the road surface gradient value (Steps S8, S10, and S11), the determination is executed whether or not the steering angle is equal to or greater than the predetermined value based on the input signals from the steering angle sensor 25 (Step S12).

At Step S12, when the steering angle is determined to be equal to or greater than the predetermined value (Step S12: Yes), the driving force distribution amounts to the front wheels 15L and 15R and rear wheels 21L and 21R are set in accordance with the steering angle and the road surface gradient value (Step S13). Accordingly, even when the four-wheel drive vehicle 1 is positioned on the inclined road and the driver turns the steering, the skid of wheels 15R, 15L, 21R, and 21L can be controlled.

On the other hand, at Step S12, when the steering angle is determined to be less than the predetermined value (Step S12: No), without considering the steering angle, the driving force distribution amounts to the front wheels 15L and 15R and the rear wheels 21L and 21R are set (Step S14) in accordance with the set road surface gradient value similar to the above Step S13 and the direction of the four-wheel drive vehicle 1. Accordingly, even when the four-wheel drive vehicle 1 is positioned on the inclined road and the driver does not turn the steering, the skid of wheels 15R, 15L, 21R, and 21L can be controlled.

At this point, when the control unit 10 according to the present embodiment determines that at least one of the lateral G value and the longitudinal G value is equal to or greater than the predetermined value (at least one of Step S6 and Step S7 is Yes), compared with the case when both of the lateral G value and the longitudinal G value are less than the predetermined value (when the four-wheel drive vehicle 1 is positioned on the flat road), the driving force distribution amount is set so that a difference between the driving force distribution amount to the front wheels 15L and 15R, and the driving force distribution amount to the rear wheel 21L and 21R is small.

4. The Direction of the Four-Wheel Drive Vehicle 1 and the Longitudinal G Value and the Lateral G Value The relationships between the direction to which the four-wheel drive vehicle 1 faces, the longitudinal G value detected by the longitudinal G sensor 26, and the lateral G value detected by the lateral G sensor 27 of the four-wheel drive vehicle 1 will be described by using FIG. 4 to FIG. 6.

Figure 4:
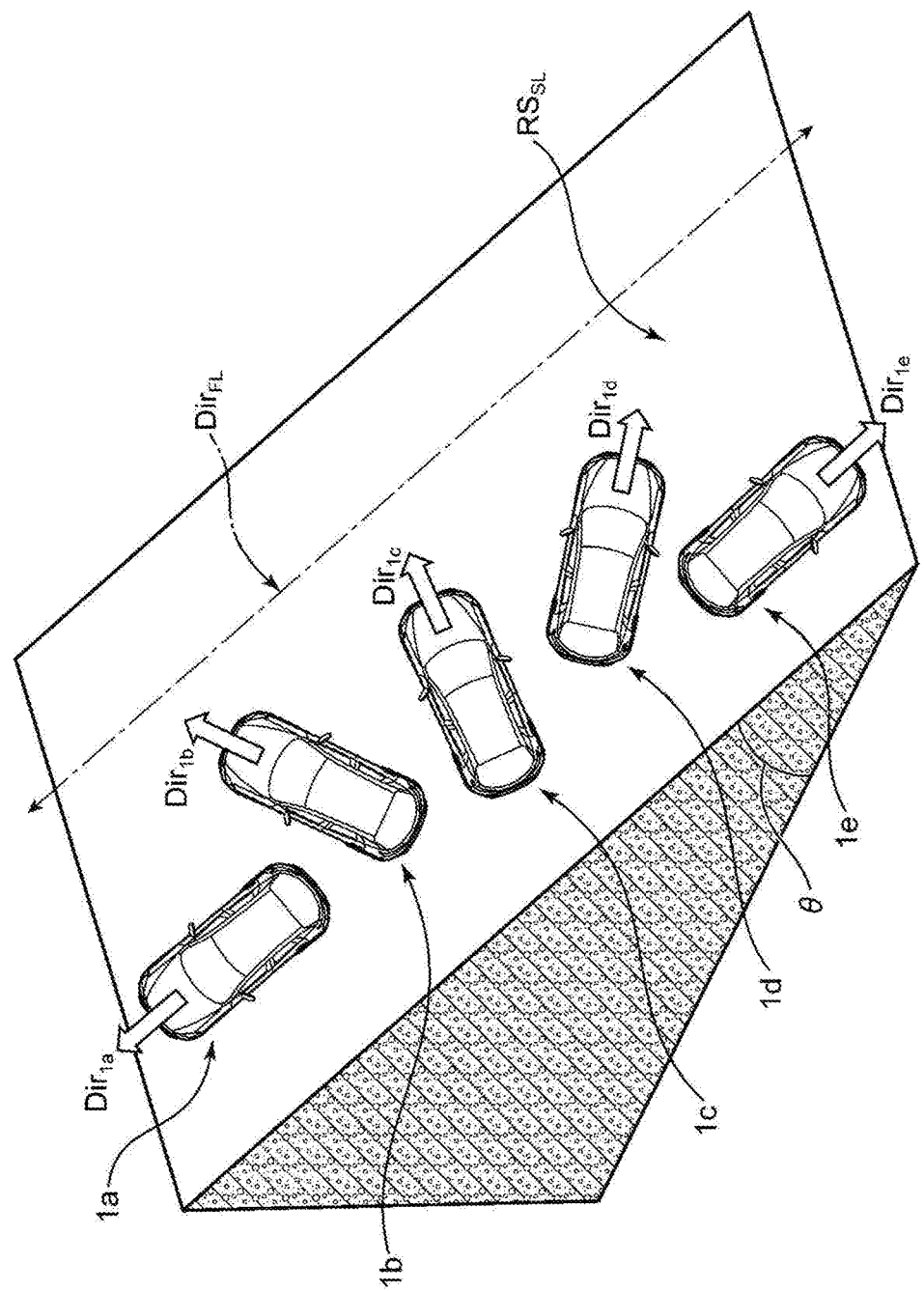
FIG. 4 is a schematic diagram showing the state of four-wheel drive vehicles against an inclined road.

As shown in FIG. 4, on an assumed case that four-wheel drive vehicles 1a to 1e face towards five directions $Dir_{1a}$ to $Dir_{1e}$ on an inclined road $RS_{SL}$ with a gradient value θ, the longitudinal G value and the lateral G value will be described respectively.

4-1. Four-Wheel Drive Vehicle 1a

Figure 5A:
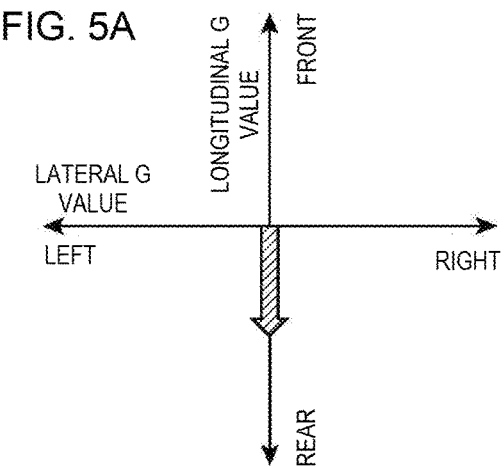
FIGS. 5A to 5E are characteristics diagrams showing a longitudinal G value and a lateral G value of each four-wheel drive vehicle of FIG. 4.
Figure 6A:
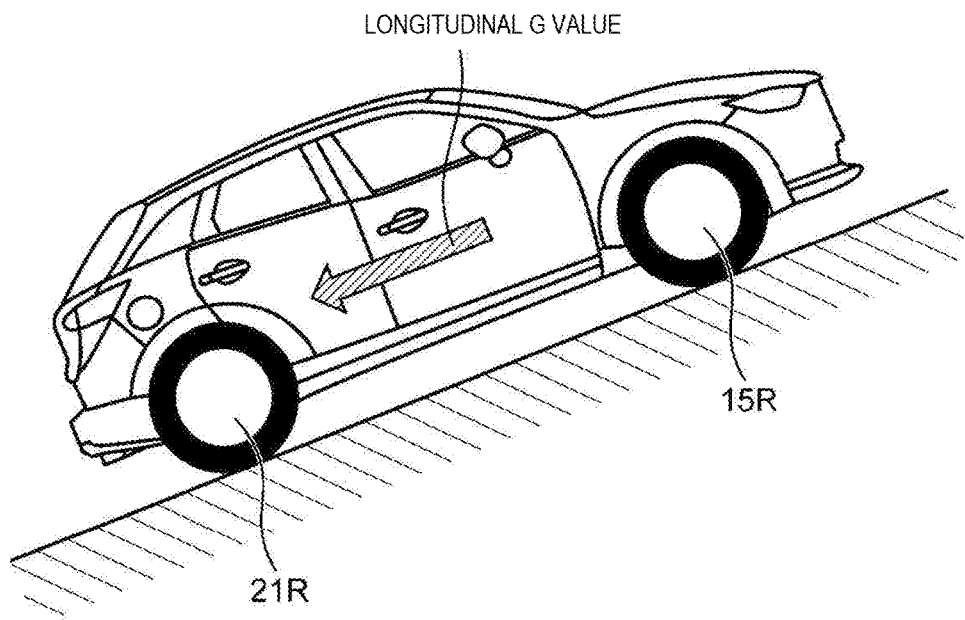
FIG. 6A shows G that is detected in the state of the first four-wheel drive vehicle of FIG. 4

As shown in FIG. 4, the direction $Dir_{1a}$ of the four-wheel drive vehicle 1a faces an uphill direction along the maximum tilt line direction $Dir_{FL}$. In this situation, as shown in FIG. 5A and FIG. 6A, only the longitudinal G value is detected, however the lateral G value is not detected.

Figure 3:
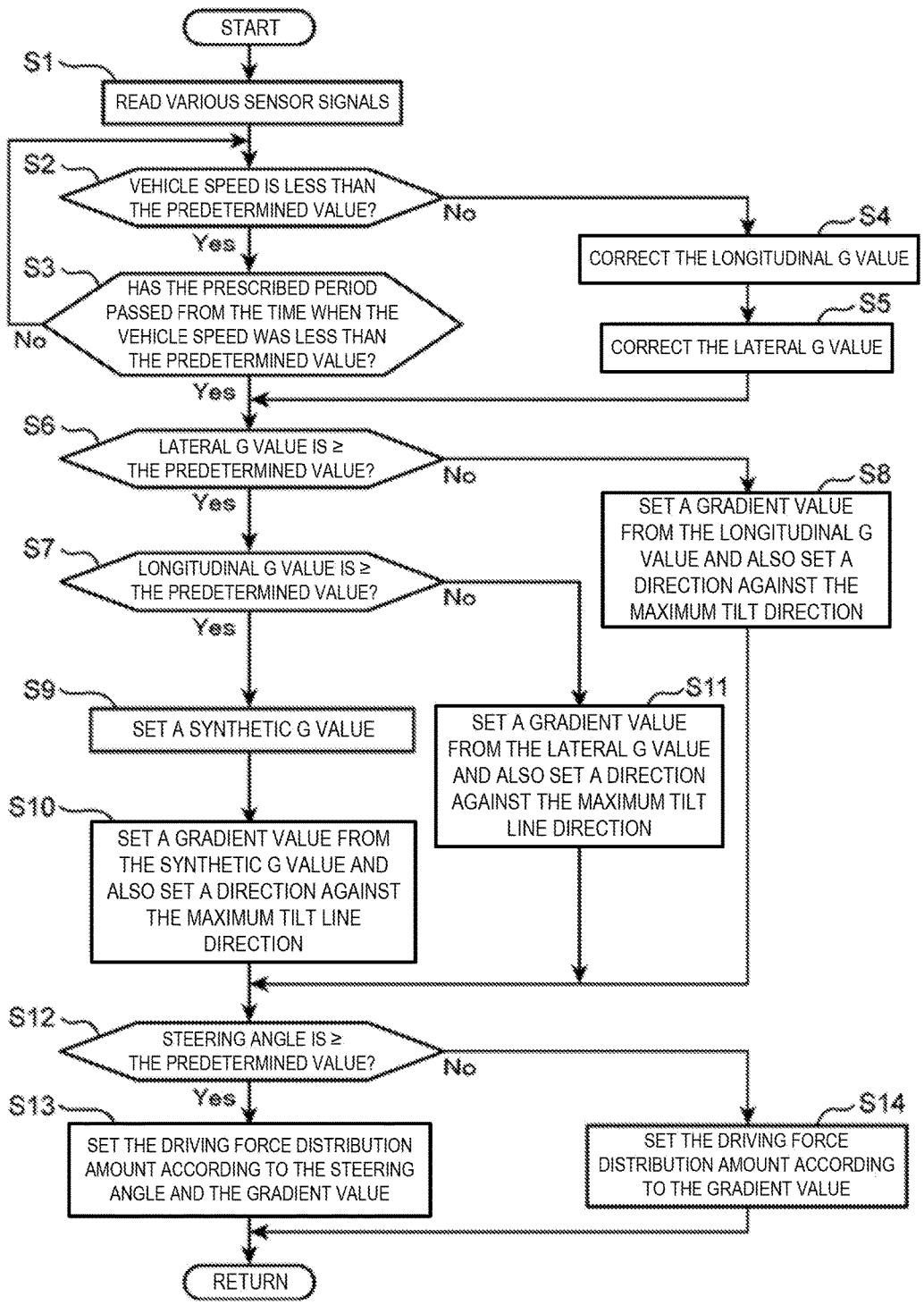
FIG. 3 is a flow chart showing controls that a control unit of the four-wheel drive vehicle executes.

For the four-wheel drive vehicle 1a facing this direction, the road surface gradient value is set from the longitudinal G value and also the direction of the four-wheel drive vehicle 1a against the maximum tilt line direction $Dir_{FL}$ is set (Step S8 in FIG. 3).

4-2. Four-Wheel Drive Vehicle 1b

Figure 5D:
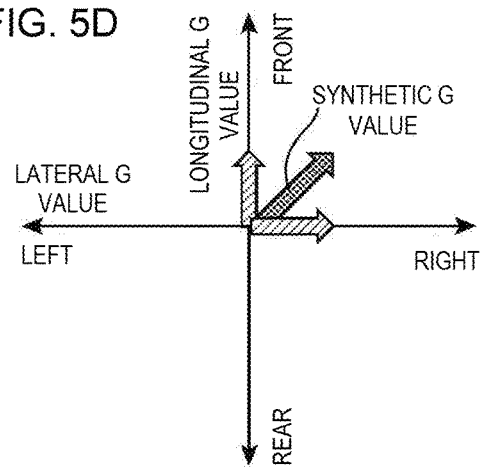
Figure 5B:
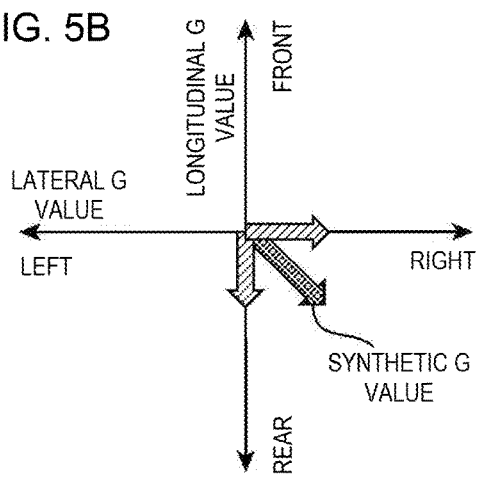

As shown in FIG. 4, the direction $Dir_{1b}$ of the four-wheel drive vehicle 1b intersects the maximum tilt line direction $Dir_{FL}$ and faces the diagonally upward of the hill. In this situation, as shown in FIG. 5B, the back facing G and the right facing G are applied to the four-wheel drive vehicle 1b.

For the four-wheel drive vehicle 1b facing this direction, the composite G value of the longitudinal G value and the lateral G value is set (Step S9 in FIG. 3), the road surface gradient value is set from the composite G value, and also the direction of the four-wheel drive vehicle 1b against the maximum tilt line direction $Dir_{FL}$ is set (Step S10 in FIG. 3).

4-3. Four-Wheel Drive Vehicle 1c

Figure 5E:
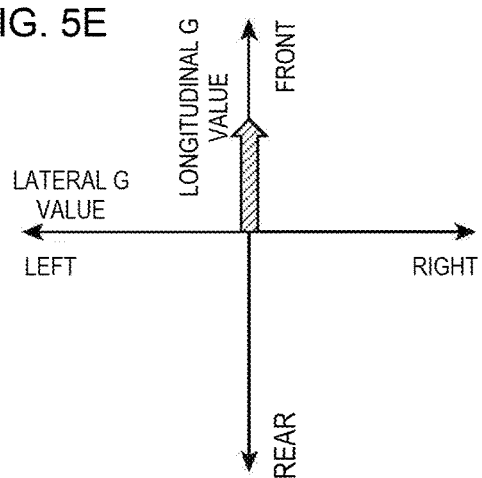
Figure 5C:
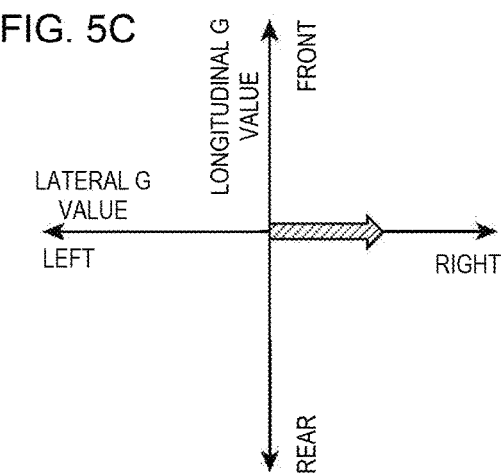
Figure 6B:
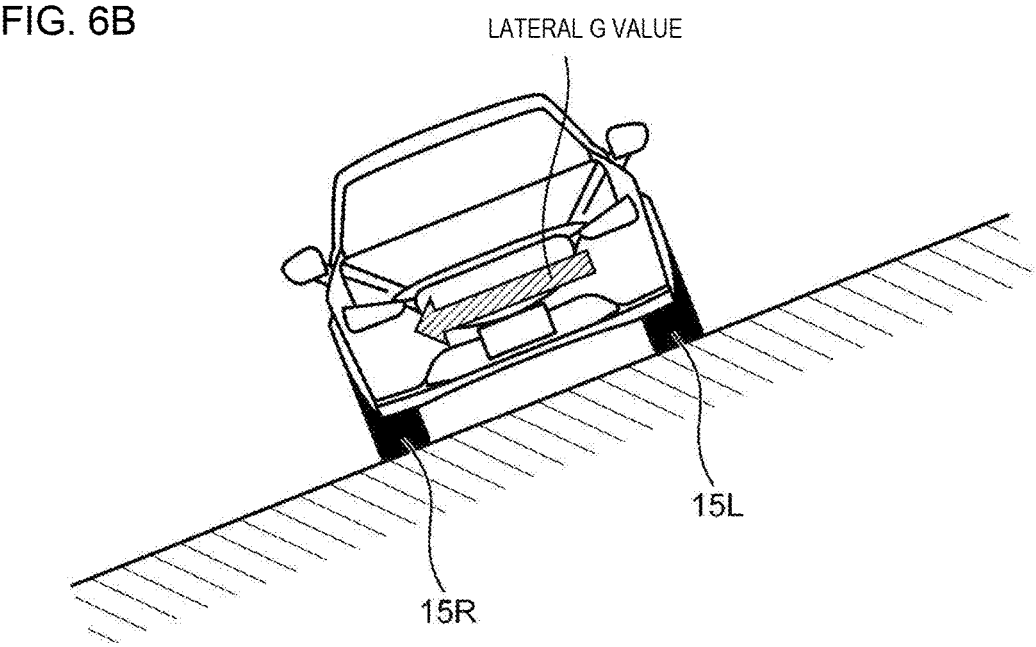
FIG. 6B shows G that is detected in the state of the third four-wheel drive vehicle of FIG. 4.

As shown in FIG. 4, the direction $Dir_{1c}$ of the four-wheel drive vehicle 1c is in the orthogonal state (orthogonal to the maximum tilt line direction $Dir_{FL}$). In this situation, as shown in FIG. 5C and FIG. 6B, only the right facing G (lateral G value) is detected, however the longitudinal G value is not detected.

For the four-wheel drive vehicle 1c facing this direction, the road surface gradient value is set from the lateral G value and also the direction of the four-wheel drive vehicle 1c against the maximum tilt line direction $Dir_{FL}$ is set (Step S11 in FIG. 3).

4-4. Four-Wheel Drive Vehicle 1d

As shown in FIG. 4, the direction $Dir_{1d}$ of the four-wheel drive vehicle 1d intersects the maximum tilt line direction $Dir_{FL}$ and faces the obliquely downward of the hill. In this situation, as shown in FIG. 5D, the forward facing G (longitudinal G value) and the right facing G (lateral G value) are applied.

For the four-wheel drive vehicle 1d facing this direction, as well as the four-wheel drive vehicle 1b, the composite G value of the longitudinal G value and the lateral G value is set (Step S9 in FIG. 3), the road surface gradient value is set from the composite G value, and also the direction of the four-wheel drive vehicle 1d against the maximum tilt line direction $Dir_{FL}$ is set (Step S10 in FIG. 3).

4-5. Four-Wheel Drive Vehicle 1e

As shown in FIG. 4, the direction $Dir_{1e}$ of the four-wheel drive vehicle 1e faces the downhill direction along the maximum tilt line direction $Dir_{FL}$. In this situation, as shown in FIG. 5E, only the forward facing G (longitudinal G value) is detected, however the lateral G value is not detected.

For the four-wheel drive vehicle 1e faces this direction, as well as the four-wheel drive vehicle 1a, the road surface gradient value is set from the longitudinal G value and also the direction of the four-wheel drive vehicle 1e against the maximum tilt line direction $Dir_{FL}$ is set (Step S8 in FIG. 3).

Moreover, in FIG. 4 and FIG. 5, as one example, the five arrangement patterns (four-wheel drive vehicles 1a to 1e) and the relationship between the longitudinal G value and the lateral G value are shown, however the road surface gradient value can be set also on various arrangement patterns other than the shown patterns.

5. Movements of the Four-Wheel Drive Vehicle 1 and the Longitudinal G Value and the Lateral G Value 5-1. Braking The longitudinal G value applied to the four-wheel drive vehicle 1 in braking is described by using FIG. 7.

As shown in FIG. 7A, when the four-wheel drive vehicle 1 travels at a constant speed ($V=V_1$), the longitudinal G value is barely detected, however the longitudinal G value might be detected with the change of the accelerator opening degree by the driver.

Moreover, the lateral G value might be detected when the four-wheel drive vehicle 1 is traveling on a curve.

Such the longitudinal G value and the lateral G value that are detected, for example when the vehicle is traveling, are the subject to correction (Step S4 and S5 in FIG. 3).

Next, as shown in FIG. 7B, when the driver steps on the brake, the speed is reduced ($V=V_2$) and becomes a stopping state ($V=0$) shown in FIG. 7C.

FIG. 7D shows schematically the longitudinal G value applied to the four-wheel drive vehicle 1 when braking shown in FIG. 7B. Moreover, FIG. 7E shows the longitudinal G value that applies to the four-wheel drive vehicle 1 immediately after stopping (for example, the period between 0.1 sec. to 0.9 sec. from the stopping) as shown in FIG. 7C.

As shown in FIG. 7E, immediately after stopping, there is a period that the longitudinal G value applies. Therefore, even when the vehicle speed is less than the predetermined value and is substantially in the stopping state (Step S2 in FIG. 3), the control that the control unit 10 executes waits the elapse of the predetermined time (Step S3 in FIG. 3). Accordingly, the influence of the longitudinal G value at immediately after stopping as shown in FIG. 7E can be eliminated.

5-2. Turning

The lateral G value that applies to the four-wheel drive vehicle 1 during turning will be described by using FIG. 8.

Figure 8:
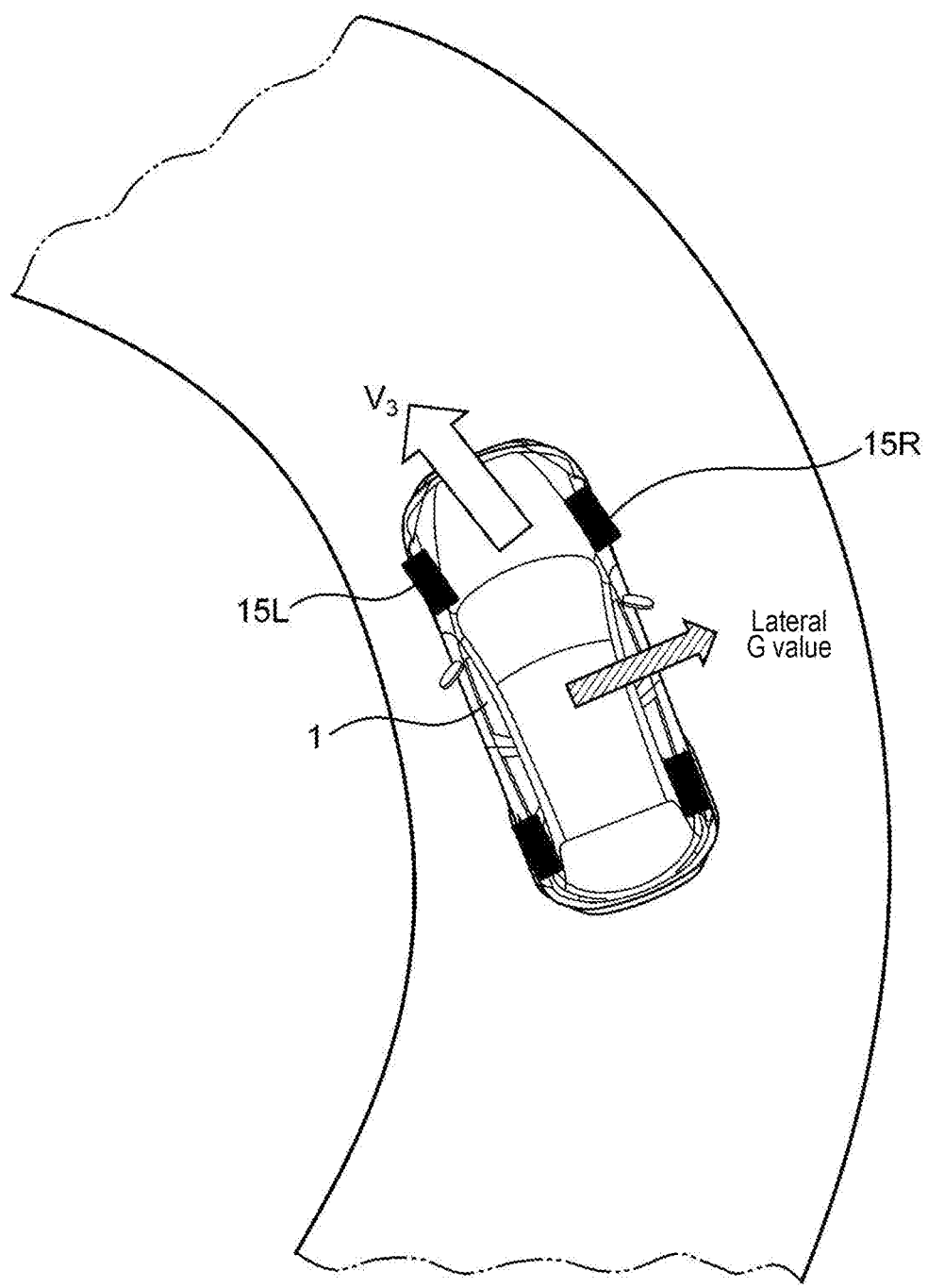
FIG. 8 is a schematic diagram showing G that applies to the four-wheel drive vehicle during turning.

As shown in FIG. 8, when the four-wheel drive vehicle 1 is curving by a speed $V_3$, the lateral G value is applied as shown in an arrow. This lateral G value might be changing momentarily due to a curvature radius of the curve, the speed $V_3$ of the four-wheel drive vehicle 1, and also the skid of the wheels 15L and 15R.

The control unit 10 according to the present embodiment sets the driving force distribution amount by taking into consideration the steering angle in addition to the road surface gradient value when the steering angle is equal to or greater than the predetermined value on its control (Step S12: Yes in FIG. 3). Accordingly, the four-wheel drive vehicle 1 can distribute the optimum amount of the driving force in accordance with the road surface state (for example, the μ of the road surface) and control the skid of the wheels 15L, 15R, 21L, and 21R.

Moreover, like the above, the longitudinal G value and the lateral G value are corrected also when the four-wheel drive vehicle 1 is traveling the curve (during turning traveling) (Step S4 and S5 in FIG. 3). Accordingly, the road surface gradient value and the direction of the four-wheel drive vehicle 1 can be set with accuracy.

5-3. Starting on the Inclined Road (1)

An embodiment that the four-wheel drive vehicle 1 starts from the stopping start on the inclined road $RS_{SL}$ will be described by using FIG. 9.

Figure 9:
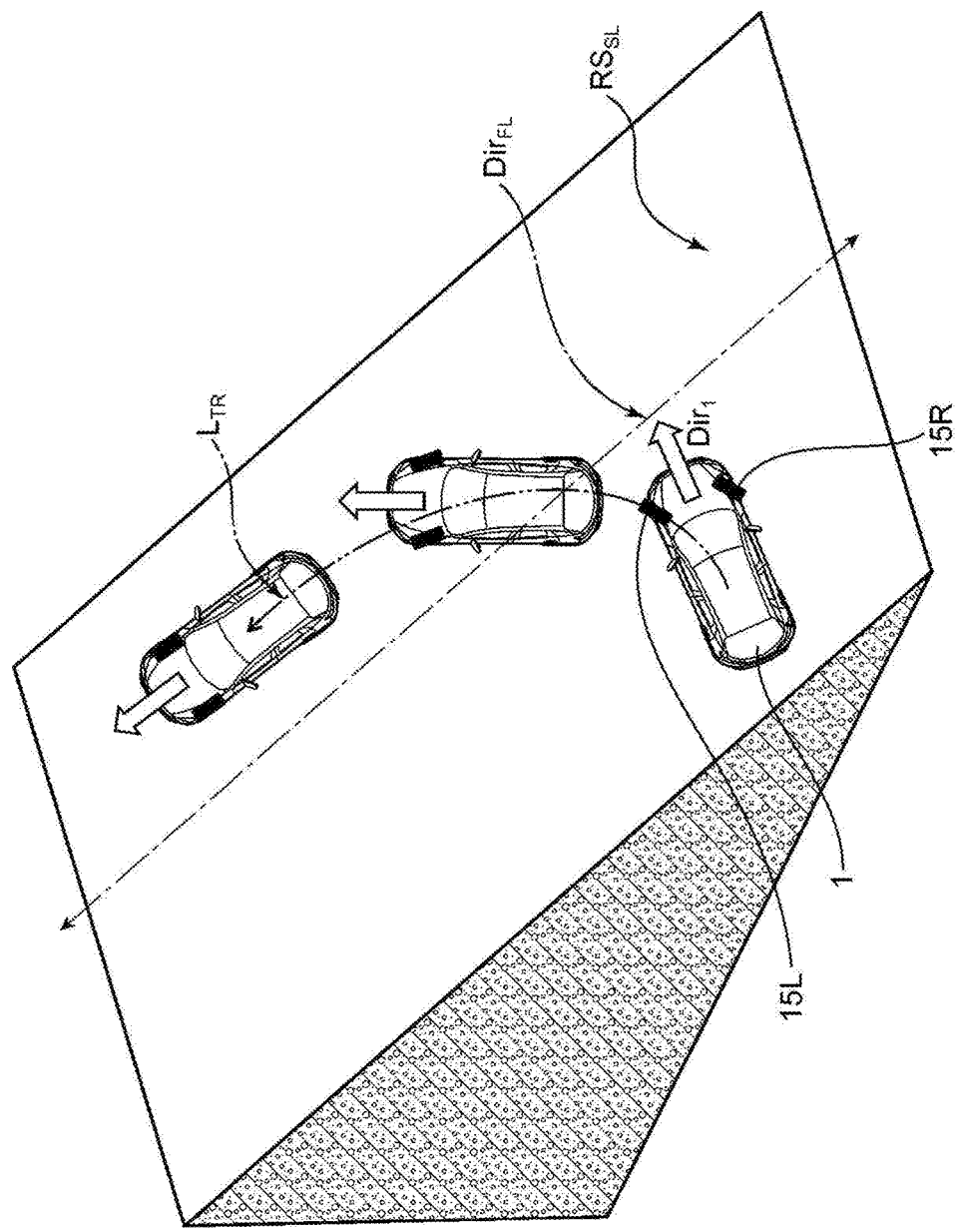
FIG. 9 is a schematic diagram showing the state that the four-wheel drive vehicle starts with turning the steering to an ascent slope direction from the stopping in the orthogonal direction of the maximum tilt line direction.

As shown in FIG. 9, the four-wheel drive vehicle 1 stops on nearly the orthogonal direction of the maximum tilt line direction $Dir_{FL}$. It is the same state as the four-wheel drive vehicle 1c shown in FIG. 4.

As described the above, the four-wheel drive vehicle 1 that stops on nearly the orthogonal direction $Dir_1$ of the maximum tilt line direction $Dir_{FL}$ is in the state that the longitudinal G is hardly applied and only the lateral G is applied (Step S6: Yes, Step S7: No, in FIG. 3). Accordingly, in this state, the control unit 10 sets the road surface gradient value from the lateral G value and also sets the direction of the four-wheel drive vehicle 1 against to the maximum tilt line direction $Dir_{FL}$.

Moreover, as shown in FIG. 9, according to the present embodiment, the steering is turned during stopping or immediately after starting and the front wheels 15L and 15R face to the ascent slope direction. That is, the state is that the steering angle is equal to or greater than the predetermined value (Step S12: Yes in FIG. 3).

When the four-wheel drive vehicle 1 is in the above state, the control unit 10 sets the driving force distribution amount in accordance with the steering angle and the road surface gradient value set from the lateral G value so that the difference between the driving force distribution amount to the front wheels 15L and 15R and the driving force distribution amount to the rear wheels 21L and 21R is small. Then, the four-wheel drive vehicle 1 travels on the ascent slope along a traveling line $L_{TR}$ without generating skid of the wheels 15L, 15R, 21L, and 21R.

5-4. Starting on the Inclined Road (2)

Another embodiment in which the four-wheel drive vehicle 1 starts from the stopping state on the inclined road $RS_{SL}$ will be described by using FIG. 10.

Figure 10:
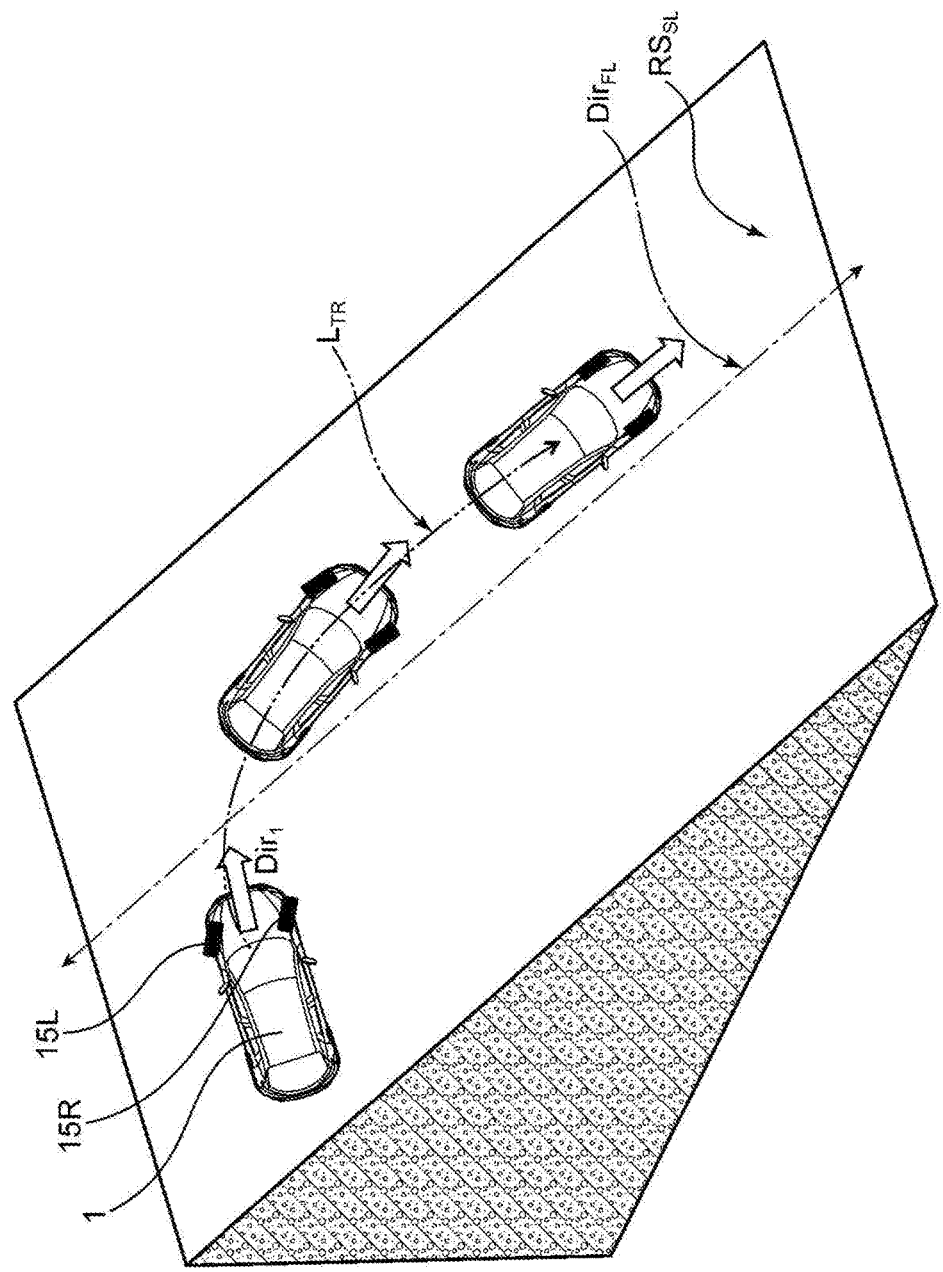
FIG. 10 is a schematic diagram showing the state that the four-wheel drive vehicle starts with turning the steering to a descend slope direction from the stopping in the orthogonal direction of the maximum tilt line direction.

As shown in FIG. 10, the four-wheel drive vehicle 1 stops on nearly the orthogonal direction Din of the maximum tilt line direction $Dir_{FL}$. It is the same state as the four-wheel drive vehicle 1c shown in FIG. 4.

As described the above, the four-wheel drive vehicle 1 that stops on nearly the orthogonal direction of the maximum tilt line direction $Dir_{FL}$ is in the state that the longitudinal G is hardly applied and only the lateral G is applied (Step S6: Yes, Step S7: No, in FIG. 3). Accordingly, in this state, the control unit 10 sets the road surface gradient value from the lateral G value and also sets the direction of the four-wheel drive vehicle 1 against to the maximum tilt line direction $Dir_{FL}$.

As shown in FIG. 10, regarding the four-wheel drive vehicle 1 according to the present embodiment, the steering is turned in the opposite direction of FIG. 9 during stopping or immediately after starting and the front wheels 15L and 15R face to the ascent slope direction. Also in this case, the state is that the steering angle is equal to or greater than the predetermined value (Step S12: Yes in FIG. 3).

Even when the four-wheel drive vehicle 1 is in the above state, the control unit 10 sets the driving force distribution amount in accordance with the steering angle and the road surface gradient value set from the lateral G value so that the difference between the driving force distribution amount to the front wheels 15L and 15R and the driving force distribution amount to the rear wheels 21L and 21R is small. Then, the four-wheel drive vehicle 1 travels on the descent slope along a traveling line $L_{TR}$ without generating skid of the wheels 15L, 15R, 21L, and 21R.

6. Effects

When the four-wheel drive vehicle 1 faces the intersecting direction against the maximum tilt line direction $Dir_{FL}$ on the inclined road $RS_{SL}$ (the four-wheel drive vehicles 1b to 1d in FIG. 4), compared with the case when the four-wheel drive vehicle 1 is positioned on the flat road, the control unit 10 of the four-wheel drive vehicle 1 according to the present embodiment sets the driving force distribution amount so that the difference between the driving force distribution amount to the front wheels 15L and 15R and the driving force distribution amount to the rear wheel 21L and 21R is small. Accordingly, the four-wheel drive vehicle 1 can control wheel skid even though it faces the intersecting direction against the maximum tilt line direction $\text{Dir}_{FL}$ on the inclined road $\text{RS}_{SL}$.

Therefore, the control unit 10 of the four-wheel drive vehicle 1 according to the present embodiment can reliably control wheel skid, and perform stable start and travel, even though the four-wheel drive vehicle 1 faces the intersecting direction against the maximum tilt line direction $\text{Dir}_{FL}$.

Moreover, the longitudinal G sensor 26 and the lateral G sensor 27 mounted on the four-wheel drive vehicle 1 might be in a singular or plural number. When a plurality of the longitudinal G sensor 26 and the lateral G sensor 27 are mounted, the control unit 10 might use a mean value or make a decision according to a majority of those output signals.

The control unit 10 of the four-wheel drive vehicle 1 according to the present embodiment, at the time of setting the driving force distribution amount to the rear wheels 21L and 21R that are sub drive wheels, uses the composite G value of the lateral G value from the lateral G sensor 17 and the longitudinal G value from the longitudinal G sensor 26. Accordingly, even though the four-wheel drive vehicle 1 faces the direction (uphill direction, downhill direction) along the maximum tilt line direction (the four-wheel drive vehicle 1a and 1e shown in FIG. 4) or the intersecting direction against the maximum tilt line direction $\text{Dir}_{FL}$ (the four-wheel drive vehicles 1b to 1d shown in FIG. 4), the driving force distribution amount can be set with accuracy.

Therefore, even though the four-wheel drive vehicle 1 faces any directions on the inclined road $\text{RS}_{SL}$, the control unit 10 of the four-wheel drive vehicle 1 can control the skid of the wheels 15L, 15R, 21L, and 21R at the time of starting and traveling of the four-wheel drive vehicle 1.

When the four-wheel drive vehicle 1 faces the directions such as the four-wheel drive vehicles 1b and 1d in FIG. 4, the control unit 10 of the four-wheel drive vehicle 1 according to the present embodiment sets the direction of the four-wheel drive vehicle 1 against the maximum tilt line direction as well as sets a road surface gradient value of the inclined road $\text{RS}_{SL}$ based on the set composite G value from the longitudinal G value and the lateral G value, and then sets the driving force distribution amount. Therefore, even though the four-wheel drive vehicle 1 faces any directions on the inclined road $\text{RS}_{SL}$, the control unit 10 of the four-wheel drive vehicle 1 can control the skid of the wheels 15L, 15R, 21L, and 21R at the time of starting and traveling of the four-wheel drive vehicle 1.

While the four-wheel drive vehicle 1 is traveling, the longitudinal G is applied in accordance with traveling. Even when the longitudinal G is applied in accordance with traveling, the control unit 10 of the four-wheel drive vehicle 1 according to the present embodiment executes the correction of the longitudinal Gas shown Step S4 in FIG. 3. Therefore, only the longitudinal G value due to the road surface gradient can be extracted and it works to effectively control the skid of wheels 15L, 15R, 21L, and 21R. Similarly, as Step S5 in FIG. 3, since the lateral G value is also corrected, only the lateral G value due to the road surface gradient can be extracted and it works to effectively control the skid of wheels 15L, 15R, 21L, and 21R due to the road surface gradient.

The control unit 10 of the four-wheel drive vehicle 1 according to the present embodiment estimates a traveling direction from the steering angle and previously sets the driving force distribution amount based on the estimated value so that the difference between the driving force distribution amount to the front wheels 15L and 15R and the driving force distribution amount to the rear wheels 21L and 21R is small. Accordingly, as shown in FIG. 9 and FIG. 10, even when the four-wheel drive vehicle 1, which stopped in the intersecting direction against the maximum tilt line direction $\text{Dir}_{FL}$, ascends a slope or descends a slope immediately after the start, wheel skid can be certainly controlled since the driving force distribution amount to the rear wheels 15L and 15R that are the sub drive wheels is previously set.

Second Embodiment

The configuration of a four-wheel drive vehicle 2 according to a second embodiment of the present invention will be described by using FIG. 11 and FIG. 12.

The four-wheel drive vehicle 1 according to the first embodiment adopts the configuration to distribute the driving force from the engine 11 also to the rear wheels 21L and 21R through the propeller shaft 17.

Figure 11:
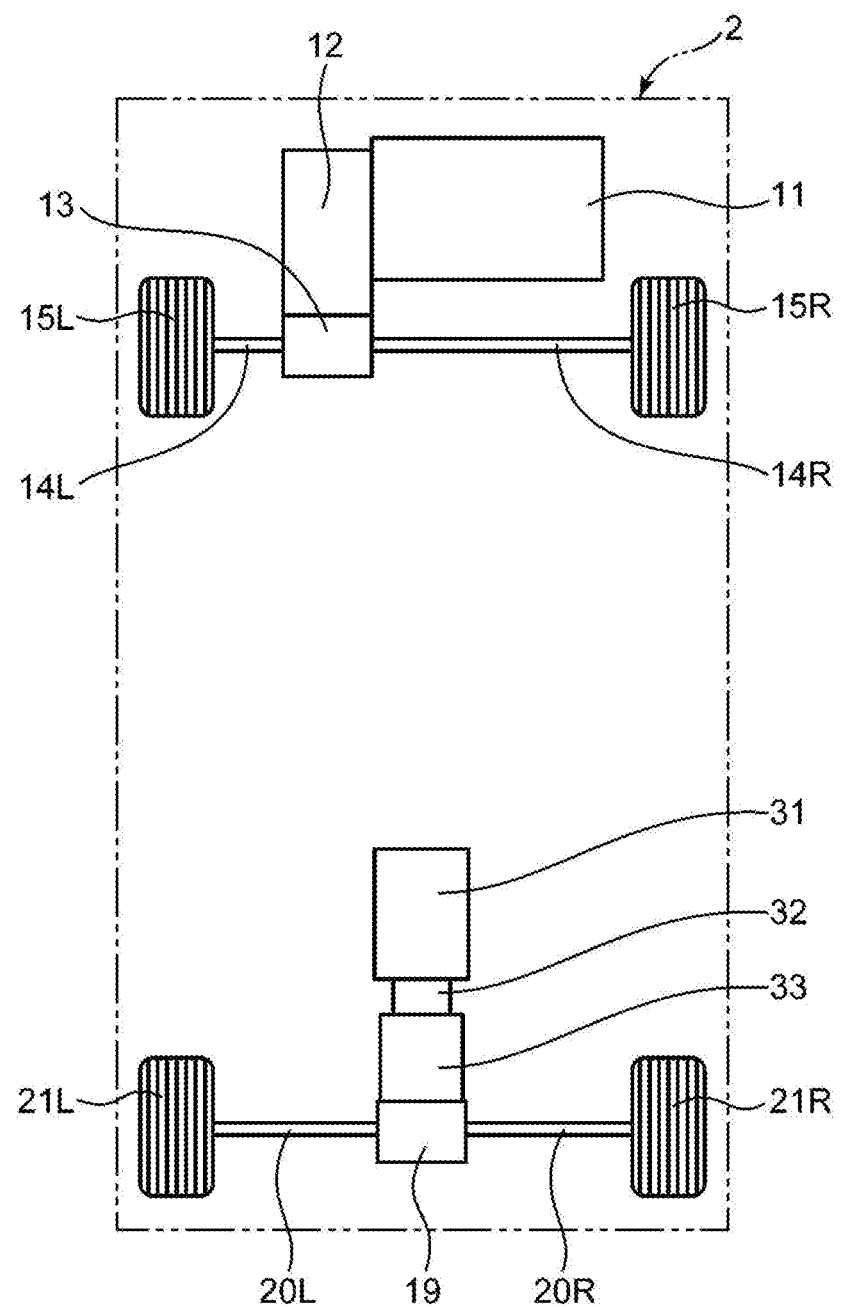
FIG. 11 is a schematic diagram showing a schematic configuration of a four-wheel drive vehicle according to a second embodiment of the present invention.

On the other hand, as shown in FIG. 11, regarding the four-wheel drive vehicle 2 according to the present embodiment, the driving force of the engine 11 is transmitted to only the front wheels 15L and 15R. Moreover, the four-wheel drive vehicle 2 has a motor 31 as a driving source of the rear wheels 21L and 21R.

Specifically, on the four-wheel drive vehicle 2, the engine 11 is arranged in the front, and the driving force is transmitted to a left front drive shaft 14L and a right front drive shaft 14R through an automatic transmission 12 and a differential gear 13. By transmitted driving force, the left front wheels 15L and the right front wheels 15R are driven.

On the other hand, a motor 31 is arranged in a rear part of the four-wheel drive vehicle 2, and the driving force is transmitted to a left rear drive shaft 20L and a right rear drive shaft 20R through a clutch 32, a decelerating gear unit 33, and a rear differential gear 19. By transmitted driving force, the left rear wheel 21L and the right rear wheel 21R are driven.

Moreover, the driving force generated at the motor 31 is transmitted to the rear wheels 21L and 21R when the clutch 32 is in an engaged state, however it is not transmitted when the clutch 32 is in a disengaged state.

Figure 12:
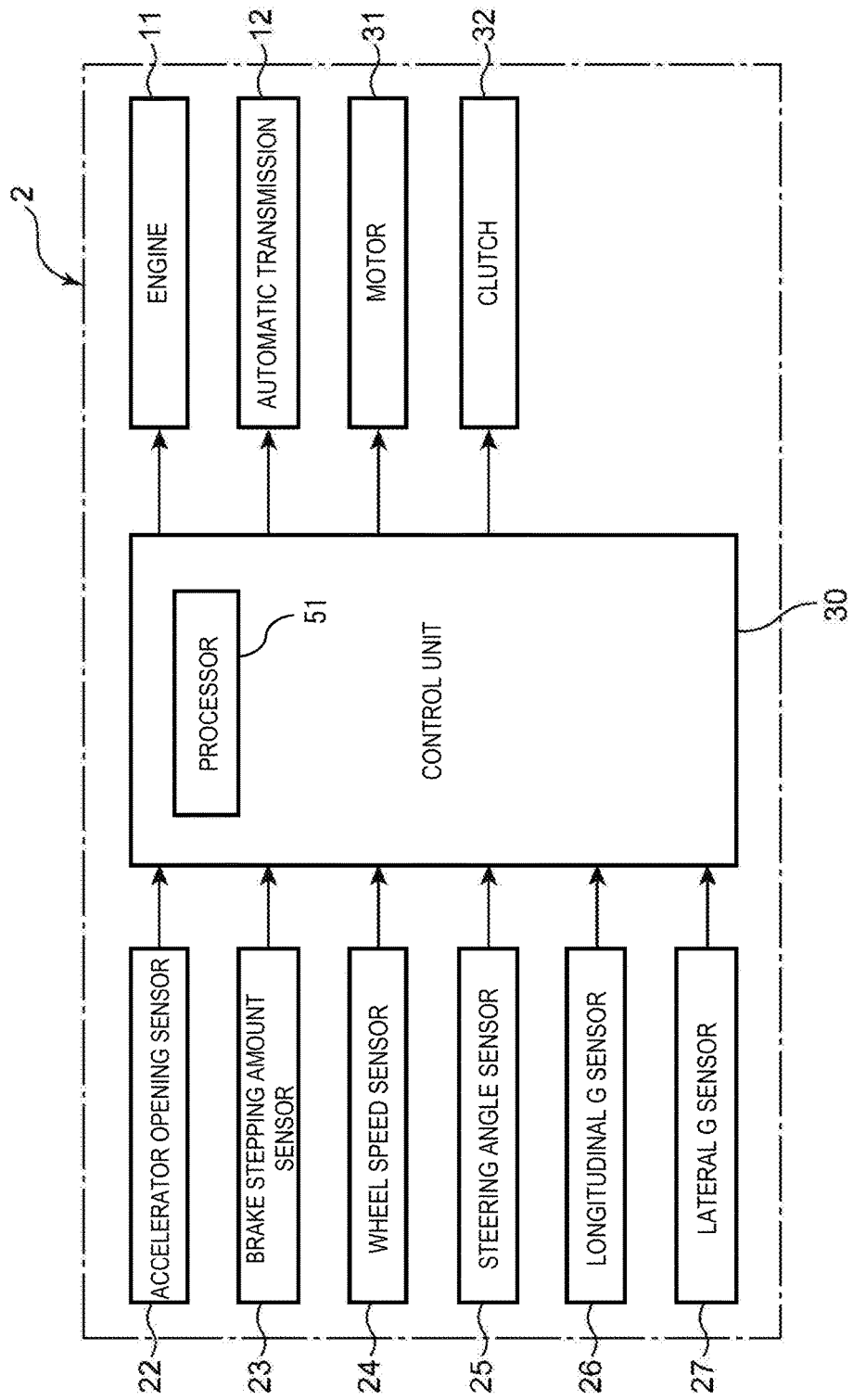
FIG. 12 is a schematic block diagram showing a configuration according to controls of the four-wheel drive vehicle of the second embodiment.

As shown in FIG. 12, as in the first embodiment, various detection signals from an accelerator opening sensor 22, a brake stepping amount sensor 23, a wheel speed sensor 24, a steering angle sensor 25, the longitudinal G sensor 26, and the lateral G sensor 27 are input to a processor 51 of a control unit 30 of the four-wheel drive vehicle 2.

Moreover, although not shown in FIG. 12, a motor rotation speed sensor for monitoring the rotation speed of the motor 31 is mounted, and the detection signal related to the motor rotation speed is also input to the control unit 30.

Furthermore, not shown in figures, an inverter circuit unit, which is connected to the motor 31, for rotation speed control of the motor 31 is also mounted on the four-wheel drive vehicle 2.

The control unit 30 comprising a processor 51 configured to receive the various signals, and executes instructions to send out a control command to the engine 11, the automatic transmission 12, the motor 31, and the clutch 32 based on the various detection signals like the above. The control system may be embodied by the control unit 30.

The control unit 30 sets the driving force distribution amount to the front wheels 15L and 15R and the driving force distribution amount to the rear wheels 21L and 21R along the same flow as a control flow (FIG. 3) executed by the control unit 10 according to the first embodiment (Step S13 and S14 in FIG. 3).

The four-wheel drive vehicle 2 according to the present embodiment has the configuration that the rear wheels 21L and 21R are driven by the driving force of the motor 31. Therefore, when determining that the driving force distribution to the rear wheels 21L and 21R is needed, the control unit 30 rotates the motor 31 at a predetermined rotation speed and makes the clutch 32 in the engaged state.

On the other hand, when the driving force transmission to only the front wheels 15L and 15R, such as when traveling at high speeds, is needed, the control unit 30 stops the rotation of the motor 31 and make the clutch 32 in the disengaged state. Therefore, when traveling at high speeds on a dry road surface, the four-wheel drive vehicle 2 drives only the front wheels 15L and 15R that are the main drive wheels, and if it is necessary, drives also the rear wheels 21L and 21R that are the sub drive wheels in accordance with such as the μ of the road surface. In other words, in the present embodiment also, when the four-wheel drive vehicle 2 is positioned on the low μ road such as a wet road or a frozen road, the driving force distribution amount is set so that the difference between the driving force distribution amount to the front wheels 15L and 15R, and the driving force distribution amount to the rear wheels 21L and 21R is small.

At this point, when the four-wheel drive vehicle 2 moves backward on the low μ road, the rear wheels 21L and 21R might need to be driven. In such a case, the control unit 30 reverses a direction of the supply current to the motor 31 and switches the rotation direction of the motor 31.

The control unit 30 of the four-wheel drive vehicle 2 according to the present embodiment, same as the first embodiment, sets the driving force distribution amount according to the flows shown in FIG. 3. Accordingly, whatever direction on the inclined road $RS_{SL}$ the four-wheel drive vehicle 2 faces, wheel skid at the time of traveling and starting can be controlled.

Third Embodiment

The configuration of a four-wheel drive vehicle 3 according to a third embodiment of the present invention will be described by using FIG. 13.

In the second embodiment, the four-wheel drive vehicle 2, which has the engine 11 as a driving source to drive the front wheels 15L and 15R and the motor 31 as a driving source to drive the rear wheels 21L and 21R, is adopted.

Figure 13:
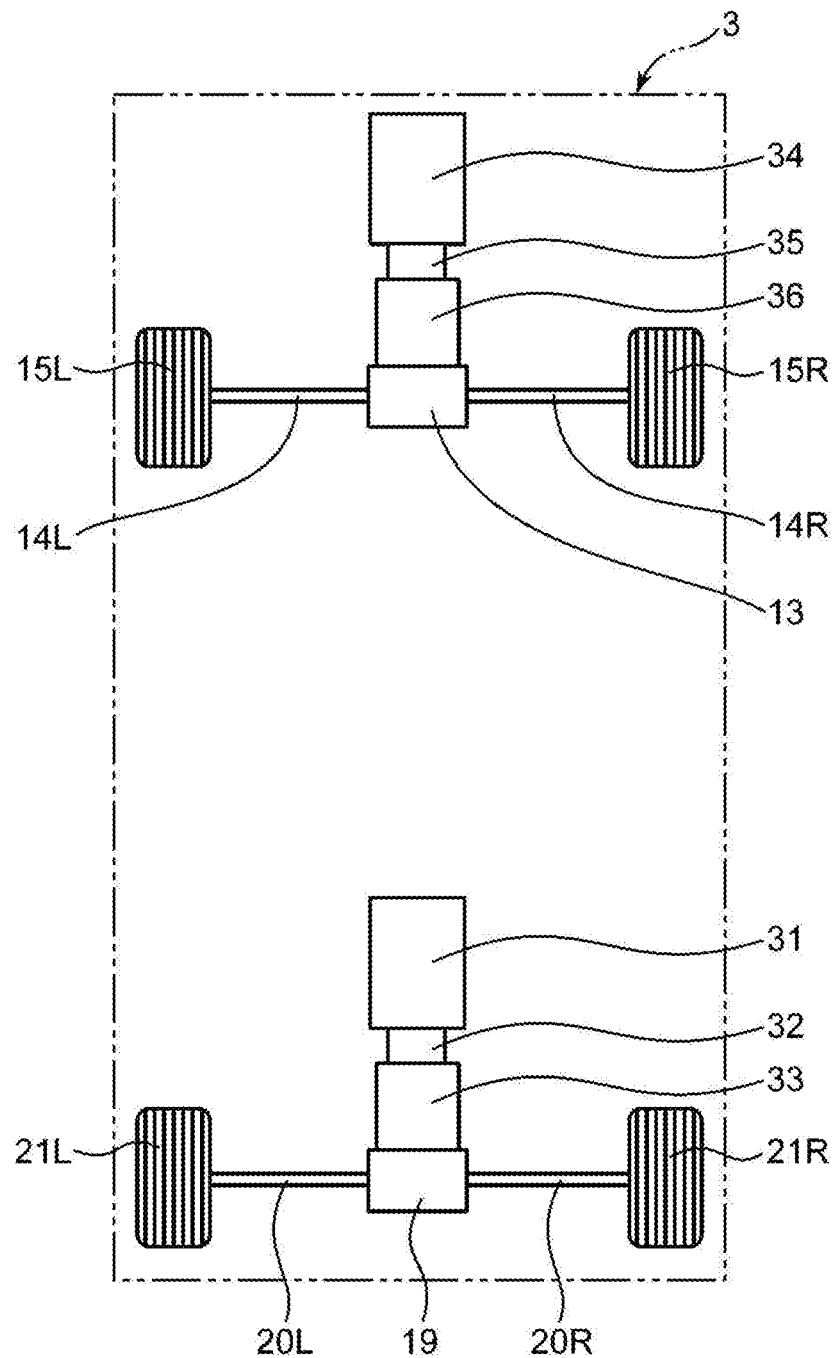
FIG. 13 is a schematic diagram showing a schematic configuration of a four-wheel drive vehicle according to a third embodiment of the present invention.

As shown in FIG. 13, the four-wheel drive vehicle 3 according to the present embodiment has a motor 34 as a driving source to drive the front wheels 15L and 15R and the motor 31 as a driving source to drive the rear wheels 21L and 21R.

The motor 34 is arranged in a front part of the four-wheel drive vehicle 3 and drives the left front drive shaft 14L and the right front drive shaft 14R through a clutch 35, a decelerating gear unit 36, and the front differential gear 13.

On the other hand, same as the second embodiment, the motor 31 is arranged in a rear part of the four-wheel drive vehicle 3 and drives the left rear drive shaft 20L and the right rear drive shaft 20R through the clutch 32 and the differential gear 19.

Regarding the present embodiment, although the illustration showing the configuration related to the control is omitted, the control unit of the four-wheel drive vehicle 3 executes each control of the rotation of the motors 31 and 34, the torque adjustment, and the switching the rotation direction and also executes a disengagement control of the clutches 32 and 35. Accordingly, the four-wheel drive vehicle 3 can control up to the degree of front wheels:rear wheels=100:0 to 0:100, and can control more in accordance with road surface conditions or the traveling scene (state). Therefore, in the four-wheel drive vehicle 3 according to the present embodiment, although a "main drive wheel" and a "sub drive wheel" are not used in a strict sense, the drive wheel that mainly drives at the time of ordinary traveling, such as on the flat road, can be defined as a "main drive wheel."

Moreover, the control unit of the four-wheel drive vehicle 3 according to the present embodiment, as in the first embodiment and the second embodiment, sets the driving force distribution amount according to the flows shown in FIG. 3. In other words, the control unit according to the present embodiment also sets the driving force distribution amount so that the difference between the driving force distribution amount to the front wheels 15L and 15R and the driving force distribution amount to the rear wheels 21L and 21R is small. Therefore, whichever direction the four-wheel drive vehicle 3 according to the present embodiment faces on the inclined road $RS_{SL}$, wheel skid at the time of traveling and starting can be controlled.

[Modification]

In the first embodiment, as described by using FIG. 9 and FIG. 10, regarding the direction where the vehicle tries to advance, the detection signals related to the steering angle by the steering angle sensor is used, however the present invention is not limited to this. Moreover, the information from a navigation system might be used.

Furthermore, in the present invention, in order to set the driving force distribution amount, consideration of the steering angle is not always necessary, and it might be set from the road surface gradient value that is set from the longitudinal G value and the lateral G value.

Moreover, from the first embodiment to the third embodiment, the driving force distribution amount is set in accordance with the directions of the four-wheel drive vehicles 1, 2, and 3 or the steering angles on the inclined road $RS_{SL}$. In addition to that, the present invention can make the frictional coefficient (μ) of the road surface on the inclined road $RS_{SL}$ as a requirement when setting the driving force distribution amount. As a method of estimating the frictional coefficient on the road surface, for example the operating state of wipers, the outside air temperature, the steering torque/power steering motor electric current, and the like can be used. When the wipers are operating, it is presumed that it is raining and the frictional resistance of the road surface is low (low μ road).

It is presumed that the frictional coefficient is low because of the frozen road surface when the outside air temperature is less than 0° C. Moreover, regarding the steering torque/power steering motor electric current, it is presumed that the assist amount is small and the frictional resistance of the road surface is low when the power steering motor electric current is low to the input steering torque.

In the second embodiment, the four-wheel drive vehicle 2, which has the engine 11 and the motor 31 as a driving source, is adopted, and in the third embodiment, the four-wheel drive vehicle 3, which has two motors 31 and 34 as a driving source, is adopted. Other than this, if the present invention is applied to the four-wheel drive vehicle that has four in-wheel motors, the similar effect like the above can be obtained.

Moreover, from the first embodiment to the third embodiment, setting methods of the driving force distribution amount to the four-wheel drive vehicles 1, 2, and 3 are shown. However, the method of setting the road surface gradient value from the longitudinal G value and lateral G value and setting the vehicle direction to the maximum tilt line direction is not limited to the four-wheel drive vehicle and can be applied to a wide range of vehicles. For example, to two-wheel drive vehicles such as FF vehicle, FR vehicle, RR vehicle (rear engine/rear drive vehicle), or MR vehicle (mid engine/rear drive vehicle), based on the set road surface gradient value, it is possible to adjust the driving force distribution amount to the bilateral wheels and also adjust the damping force of the suspension.

Moreover, the road surface gradient value set from the longitudinal G value and the lateral G value are input to a traction control system (TCS) or an electronic stability control processor (ESC) and then also used by the control thereof.

Furthermore, in the first embodiment and the second embodiment, the FF base four-wheel drive vehicles 1 and 2 are adopted as one example, the present invention is not limited to this, and the FR base four-wheel drive vehicle or the MR base four-wheel drive vehicle can be also adopted. For these four-wheel drive vehicles, the rear wheels might be the main drive wheel and the front wheels might be the sub drive wheel. Such a four-wheel drive vehicle, which rear wheels are the main drive wheel, is traveled by distributing the driving force to only the rear wheels when traveling on the flat road, and when traveling on the low μ road, the driving force distribution amount that increases the driving force distribution to the front wheels can be set so that the difference between the driving force distribution amount to the front wheels and the driving force distribution amount to the rear wheels is small.

Moreover, in the second embodiment, although one control unit 30 controls the engine 11, the automatic transmission 12, and the motor 31, these might be divided into two parts and a mutually cooperative control might be executed. The control unit according to the third embodiment is also the same.

Moreover, in Step S12 in FIG. 3, the control unit determines whether the steering angle is equal to or greater than the predetermined value, when the steering angle is equal to or greater than the predetermined value, the driving force distribution amount is set in accordance with the steering angle and the road surface gradient value. At this point, when the steering angle is large, it is considered that a so-called tight corner braking phenomenon might be occurred. Accordingly, in order to control the occurrence of the tight corner braking phenomenon, restraint the driving force distribution amount to the sub drive wheel might be also possible.

Moreover, in FIG. 2, although the longitudinal G sensor 26 and the lateral G sensor 27 are shown as separate devices, the present invention is not limited to this. For example, by using one two-dimensional G sensor, the longitudinal G and the lateral G can be detected.

Moreover, by storing information related to the frictional resistance between the road surface and the tires on a preceding certain fixed period of time, the information can be used for setting the driving force distribution amount. Therefore, the control with considering the factor of the grip force of tires can be executed.

It should be understood that the embodiments herein are illustrative and not restrictive, since the scope of the invention is defined by the appended claims rather than by the description preceding them, and all changes that fall within metes and bounds of the claims, or equivalence of such metes and bounds thereof, are therefore intended to be embraced by the claims.

DESCRIPTION OF REFERENCE CHARACTERS

1, 2, 3 Four-wheel drive vehicle
10, 30 Control unit (Control system)
11 Engine (Driving source)
12 Automatic transmission
15L and 15R Front wheels (Main drive wheels)
18 Electronic control 4WD coupling (Driving force distribution device)
21L, 21R Rear wheels (Sub drive wheels)
25 Steering angle sensor
26 Longitudinal G sensor
27 Lateral G sensor
31, 34 Motor (Driving source)
32, 35 Clutch
33, 36 Decelerating gear unit

The invention claimed is:

1. A control system of a four-wheel drive vehicle including a driving source to generate a driving force for vehicle traveling, front wheels and rear wheels, and a driving force distribution device for distributing the driving force to the front wheels and the rear wheels, the control system comprising:
a lateral G sensor for detecting an acceleration in a horizontal direction of the four-wheel drive vehicle;
a longitudinal G sensor for detecting an acceleration in a longitudinal direction of the four-wheel drive vehicle; and
a processor configured to execute instructions to:
determine whether or not the four-wheel drive vehicle faces an intersecting direction against a maximum tilt line direction on an inclined road, wherein, when a lateral G value output from the lateral G sensor is equal to or greater than a first predetermined value, the processor determines that the four-wheel drive vehicle faces the intersecting direction;
when the four-wheel drive vehicle is traveling or stopping on the inclined road, the lateral G value output from the lateral G sensor is equal to or greater than the first predetermined value, and a longitudinal G value output from the longitudinal G sensor is equal to or greater than a second predetermined value, set a composite G value of the lateral G value and the longitudinal G value, and set a driving force distribution amount based on the set composite G value; and
when determining that the four-wheel drive vehicle does face the intersecting direction, set a driving force distribution amount based on the set composite G value so that a difference between a driving force amount distributed to the front wheels and a driving force amount distributed to the rear wheels is smaller than in a case where the four-wheel drive vehicle is on a flat road as indicated by both the lateral G value being less than the first predetermined value and the longitudinal G value being less than the second predetermined value, and command the driving force distribution device so as to distribute the driving force by the set driving force distribution amount.

2. The control system according to claim 1,
wherein the processor determines whether or not the four-wheel drive vehicle is traveling, and when determining the four-wheel drive vehicle is traveling, executes a first correction to subtract a G value that is generated according to traveling of the four-wheel drive vehicle from the longitudinal G value.

3. The control system according to claim 2,
wherein when determining the four-wheel drive vehicle is traveling, the processor executes a second correction to subtract the G value that is generated according to traveling of the four-wheel drive vehicle from the lateral G value.

4. The control system according to claim 3, wherein the processor is further configured to execute instructions to:
determine a steering angle from a steering angle sensor,
determine whether or not the four-wheel drive vehicle proceeds along the inclined road in an ascent slope direction or a descent slope direction based on the steering angle and the lateral G value, and
when determining that the four-wheel drive vehicle proceeds along the inclined road in the ascent slope direction or the descent slope direction, set the driving force distribution amount so that the difference between the driving force amount distributed to the front wheels and the driving force amount distributed to the rear wheels is smaller than in a case of determining that the four-wheel drive vehicle proceeds along the inclined road in neither the ascent slope direction nor the descent slope direction.

5. The control system according to claim 1,
wherein when the four-wheel drive vehicle is traveling or stopping on the inclined road, the processor:
sets a direction of the four-wheel drive vehicle against the maximum tilt line direction;
sets a road surface gradient value of the inclined road based on the set composite G value; and
sets the driving force distribution amount based on the set road surface gradient value and the set direction of the four-wheel drive vehicle.

6. The control system according to claim 5,
wherein the processor determines whether or not the four-wheel drive vehicle is traveling, and when determining the four-wheel drive vehicle is traveling, executes a first correction to subtract a G value that is generated according to traveling of the four-wheel drive vehicle from the longitudinal G value.

7. The control system according to claim 6,
wherein when determining the four-wheel drive vehicle is traveling, the processor executes a second correction to subtract the G value that is generated according to traveling of the four-wheel drive vehicle from the lateral G value.

8. The control system according to claim 7,
wherein the processor is further configured to execute instructions to:
determine whether or not the four-wheel drive vehicle proceeds along the inclined road in an ascent slope direction or a descent slope direction based on an estimated value related to a traveling direction, and
when determining that the four-wheel drive vehicle proceeds along the inclined road in the ascent slope direction or the descent slope direction, set the driving force distribution amount so that the difference between the driving force amount distributed to the front wheels and the driving force amount distributed to the rear wheels is smaller than in a case of determining that the four-wheel drive vehicle proceeds along the inclined road in neither the ascent slope direction nor the descent slope direction.

9. The control system according to claim 8,
wherein the traveling direction is estimated based on input from a steering angle sensor for detecting a steering angle.

10. The control system according to claim 1,
wherein the processor determines whether or not the four-wheel drive vehicle is traveling, and when determining the four-wheel drive vehicle is traveling, executes a second correction to subtract a G value that is generated according to traveling of the four-wheel drive vehicle from the lateral G value.

11. The control system according to claim 10, wherein the processor is further configured to execute instructions to:
determine a steering angle from a steering angle sensor,
determine whether or not the four-wheel drive vehicle proceeds along the inclined road in an ascent slope direction or a descent slope direction based on the steering angle and the lateral G value, and
when determining that the four-wheel drive vehicle proceeds along the inclined road in the ascent slope direction or the descent slope direction, set the driving force distribution amount so that the difference between the driving force amount distributed to the front wheels and the driving force amount distributed to the rear wheels is smaller than in a case of determining that the four-wheel drive vehicle proceeds along the inclined road in neither the ascent slope direction nor the descent slope direction.

12. The control system according to claim 1, wherein the processor is further configured to execute instructions to:
determine a steering angle from a steering angle sensor,
determine whether or not the four-wheel drive vehicle proceeds along the inclined road in an ascent slope direction or a descent slope direction based on the steering angle and the lateral G value, and
when determining that the four-wheel drive vehicle proceeds along the inclined road in the ascent slope direction or the descent slope direction, set the driving force distribution amount so that the difference between the driving force amount distributed to the front wheels and the driving force amount distributed to the rear wheels is smaller than in a case of determining that the four-wheel drive vehicle proceeds along the inclined road in neither the ascent slope direction nor the descent slope direction.

13. The control system according to claim 1, wherein the processor is further configured to execute instructions to:
determine a steering angle from a steering angle sensor,
determine whether or not the four-wheel drive vehicle proceeds along the inclined road in an ascent slope direction or a descent slope direction based on the steering angle and the lateral G value, and
when determining that the four-wheel drive vehicle proceeds along the inclined road in the ascent slope direction or the descent slope direction, set the driving force distribution amount so that the difference between the driving force amount distributed to the front wheels and the driving force amount distributed to the rear wheels is smaller than in a case of determining that the four-wheel drive vehicle proceeds along the inclined road in neither the ascent slope direction nor the descent slope direction.

* * * * *